(12) United States Patent  (10) Patent No.: US 9,176,253 B2
Tay  (45) Date of Patent: Nov. 3, 2015

(54) PORTABLE INSPECTION APPARATUS

(76) Inventor: Ko Khee Tay, Singapore (SG)

(*) Notice: Subject to any disclaimer, the term of this patent is extended or adjusted under 35 U.S.C. 154(b) by 707 days.

(21) Appl. No.: 13/347,803

(22) Filed: Jan. 11, 2012

(65) Prior Publication Data

US 2013/0177134 A1   Jul. 11, 2013

(51) Int. Cl.
  *G01N 23/04* (2006.01)
  *G01V 5/00* (2006.01)

(52) U.S. Cl.
  CPC .............. *G01V 5/0016* (2013.01); *G01N 23/04* (2013.01); *G01V 5/0066* (2013.01)

(58) Field of Classification Search
  CPC .... G01N 23/04; G01V 5/0016; G01V 5/0066
  USPC .......................................................... 378/57
  See application file for complete search history.

(56) References Cited

U.S. PATENT DOCUMENTS

| | | | |
|---|---|---|---|
| 5,692,028 A | 11/1997 | Geus et al. | |
| 5,764,683 A | 6/1998 | Swift et al. | |
| 6,542,580 B1* | 4/2003 | Carver et al. | 378/57 |
| 7,352,843 B2 | 4/2008 | Hu et al. | |
| 7,486,768 B2 | 2/2009 | Allman et al. | |
| 7,497,618 B2 | 3/2009 | Chen et al. | |
| 7,663,109 B2 | 2/2010 | Kang et al. | |
| 2006/0251211 A1 | 11/2006 | Grodzins et al. | |
| 2008/0285722 A1 | 11/2008 | Bertolina | |
| 2011/0026673 A1 | 2/2011 | Mastronardi et al. | |
| 2011/0064192 A1* | 3/2011 | Morton et al. | 378/57 |

FOREIGN PATENT DOCUMENTS

| | | |
|---|---|---|
| EP | 0 807 403 A2 | 11/1997 |
| WO | WO-92/02277 A1 | 2/1992 |
| WO | WO-2004/017832 A2 | 3/2004 |
| WO | WO-2010/078481 A1 | 7/2010 |
| WO | WO-2011/008718 | 1/2011 |

OTHER PUBLICATIONS

"Collapsible Gantry Cranes", Ferret Newsletter, by Prolift Solutions Pty Ltd., Copyright Reed Business Information, http://www.ferret.com.au/c/Prolift-Solutions/Collapsible-gantry-cranes-available-from-Prolift-n842870, (Jan. 11, 2012), 2 pgs.

(Continued)

*Primary Examiner* — Glen Kao
*Assistant Examiner* — Dani Fox
(74) *Attorney, Agent, or Firm* — Schwegman Lundberg & Woessner, P.A.

(57) ABSTRACT

The invention is generally related to a portable inspection apparatus for placement in an inspection area and for inspection of vehicles passing through the inspection area. The portable inspection apparatus comprises a support structure arranged to extend away from a surface of the inspection area, a base for disposal on the surface, and an inspection field generator comprising an emitter and a detector for generating an inspection field. A first one of the emitter and the detector may be supported by the support structure and a second one of the emitter and the detector may be supported by the base. A ramp is arranged to pivot relative the surface between a stowed position and a deployed position in which the ramp extends away from the base for allowing a vehicle to pass over the ramp and the base through the inspection field.

15 Claims, 16 Drawing Sheets

(56) References Cited

OTHER PUBLICATIONS

"International Application No. PCT/SG2013/000016, International Preliminary Report on Patentability mailed Dec. 16, 2013", 13 pgs.

"International Application No. PCT/SG2013/000016, International Search Report mailed Apr. 4, 2013", 5 pgs.

"International Application No. PCT/SG2013/000016, Written Opinion mailed Apr. 4, 2013", 4 pgs.

* cited by examiner

PORTABLE INSPECTION APPARATUS

FIELD OF THE INVENTION

The present invention relates generally to inspection systems for inspection of vehicles. More particularly, the present invention relates to a portable inspection apparatus for placement in an inspection area and for inspection of vehicles passing through the inspection area.

BACKGROUND OF THE INVENTION

At cross border immigration checkpoints, inspection systems are sometimes deployed for conducting security inspection of large vehicles such as containers, vehicles or the like. In airport terminals, inspection systems are used to check contents in luggage. For example, inspection systems such as x-ray inspection systems are often used to check the contents of containers and vehicles. The x-ray inspection systems are generally fixed in a location to which the vehicles are brought for inspection by the inspection system.

However, there has been an increased need for inspection systems to be quickly transported and set up in multiple locations globally. Hence, while fixed site inspection systems can meet the requirements of inspection of vehicles, the fixed inspection systems cannot be readily relocated or transported between locations which require inspection of vehicles.

In an attempt to address the issue of transportation of inspection systems, mobile inspection systems have been developed that can be assembled and deployed in a variety of locations. Such mobile inspection systems may include a vehicle and an inspection system mounted on the vehicle. However, it is difficult to maintain the stability of such systems and a structure for balancing the vehicle in the above system is complicated. Further, such x-ray monitoring systems include a vehicle such as a truck within the system which increases manufacturing costs. Further, the vehicle requires maintenance which also increases the maintenance and service costs of such mobile inspection systems.

Still further, the mobile inspection systems generally require powerful machinery or equipment to load and unload the gantry system off the trucks for deployment at different locations. As a result, significant time and expense is still required to transport and assemble such systems.

In view of the above problems, there exists a need for an inspection system that can be configured to be set up and transported easily to locations where inspection is required.

SUMMARY OF THE INVENTION

The present invention is generally related to a portable inspection apparatus for placement in an inspection area and for inspection of vehicles passing through the inspection area.

According to an embodiment, there is a portable inspection apparatus for placement in an inspection area and for inspection of vehicles passing through the inspection area. The portable inspection apparatus comprises a support structure arranged to extend away from a surface of the inspection area, a base for disposal on the surface, and an inspection field generator comprising an emitter and a detector for generating an inspection field. The emitter may be supported by the support structure or the base. Similarly, the detector may be supported by the support structure or the base. A ramp is arranged to pivot relative the surface between a stowed position and a deployed position in which the ramp extends away from the base for allowing a vehicle to pass over the ramp and the base through the inspection field.

A plurality of pivots may be provided adjacent the ramp for allowing the ramp to move between the stowed position and the deployed position.

The first one of the emitter and the detector supported by the support structure may be configured to move between a first position at a first distance from the base and a second position at a second distance from the base.

The support structure may include an upper section and a lower section, wherein the upper section is movable relative to the lower section between the first position and the second position in which a first one of the upper section and the lower section houses a part of the second one of the upper section and the lower section.

The apparatus may be arranged for the one of the emitter and the detector supported by the support structure to be locked in the first position.

Each of the upper section and the lower section may include an aperture arranged to receive a locking member therethrough to lock the one of the emitter and the detector supported by the support structure in the first position.

The upper section may comprise a bar member and the lower section may comprise a slot for the bar member to run within the slot as the one of the emitter and the detector supported by the support structure moves between the first position and the second position. Each of the bar member and the slot may have an aperture for receiving a locking member.

The support structure may include a top section for supporting one of: the emitter and the detector.

The support structure may comprise a vertical support structure and a gantry structure extending from the vertical support structure, the gantry structure arranged to support the one of the emitter and the detector supported by the support structure.

The apparatus may be arranged for the ramp to be secure ire the stowed position.

The apparatus may further comprise a beam member provided adjacent the ramp and arranged to pivot relative the surface between a stowed position and a deployed position in which the beam member extends away from the base for allowing a vehicle to pass over the ramp and the base through the inspection field.

The ramp may be attached to the beam member.

The apparatus may further comprise a first drive system for moving the ramp between the deployed position and the stowed position.

The first drive system may be a manual rive system or a power drive system.

The manual drive system may include a lifting mechanism for moving the ramp between the stowed position and the deployed position.

The power drive system may include a fluid actuated cylinder assembly having a cylinder supported by the support structure and a piston supported by the ramp, wherein the fluid actuated cylinder assembly is arranged to actuate the piston to move the ramp between the stowed position and the deployed position.

The apparatus may further comprise a second drive system for moving the one of the emitter and the detector supported by the support structure between the first position and the second position.

The second drive system may include a manual drive system or a power drive system.

The manual drive system may include an actuator assembly arranged to move the support structure. The actuator assembly may include a rack and a pinion.

The apparatus may further comprise a controller configured for at least one of:

receiving a first control signal from a control system to control movement of the ramp relative to the surface between the deployed position and the stowed position; and receiving a second control signal from the control system to control movement of the one of the emitter and the detector supported by the support structure between the first position and the second position.

The control system may be at least one of a remote controller and a computer.

The ramp may include an aperture for bolting of the ramp to the surface.

The apparatus may further comprise a sensor disposed adjacent the ramp for detecting presence of an object on the ramp. The sensor may be supported by the beam member.

According to an embodiment, there is a method of operating a portable inspection apparatus for placement in an inspection area and for inspection of vehicles, the method comprising:

providing a support structure arranged to extend away from a surface of the inspection area;

providing a base for disposal on the surface;

generating an inspection field using an inspection field generator comprising an emitter and a detector for generating an inspection field, a first one of the emitter and the detector being supported by the support structure and a second one of the emitter and the detector being supported by the base; and pivoting a ramp relative the surface between a stowed position and a deployed position in which the ramp extends away from the base for allowing a vehicle to pass over the ramp and the base through the inspection field.

The method may further comprise: moving the one of the emitter and the detector supported by the support structure between a first position at a first distance from the base and a second position at a second distance from the base.

Moving the one of the emitter and the detector supported by the support structure may include: moving an upper section of the support structure relative to a lower section of the support structure between the first position and the second position in which a first one of the upper section and the lower section houses a part of the second one of the upper section and the lower section.

The method may further comprise locking the one of the emitter and the detector supported by the support structure in the first position.

The method may further comprise securing the ramp in the stowed position.

BRIEF DESCRIPTION OF DRAWINGS

Various embodiments of the invention will now be described, by way of example only, and will reference to the accompanying drawings in which.

DETAILED DESCRIPTION

As used in this description and in the claims, a "vehicle" is a receptacle for the storage or transportation of goods, and includes freight pallets as well as cargo containers, whether motorized or drawn, such as automobiles, trucks, ship-borne containers or the like.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

Figure 1A:
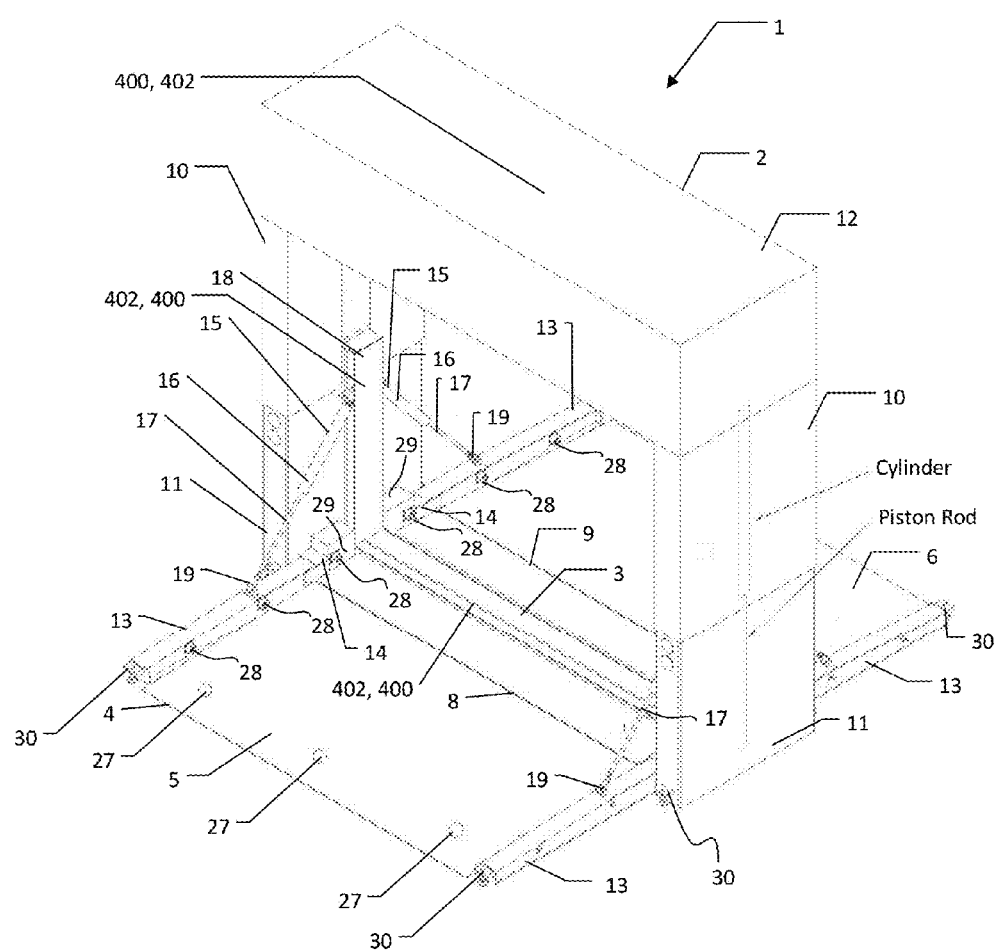
FIG. 1A illustrates a perspective view of a portable inspection apparatus in a deployed position.
Figure 1B:
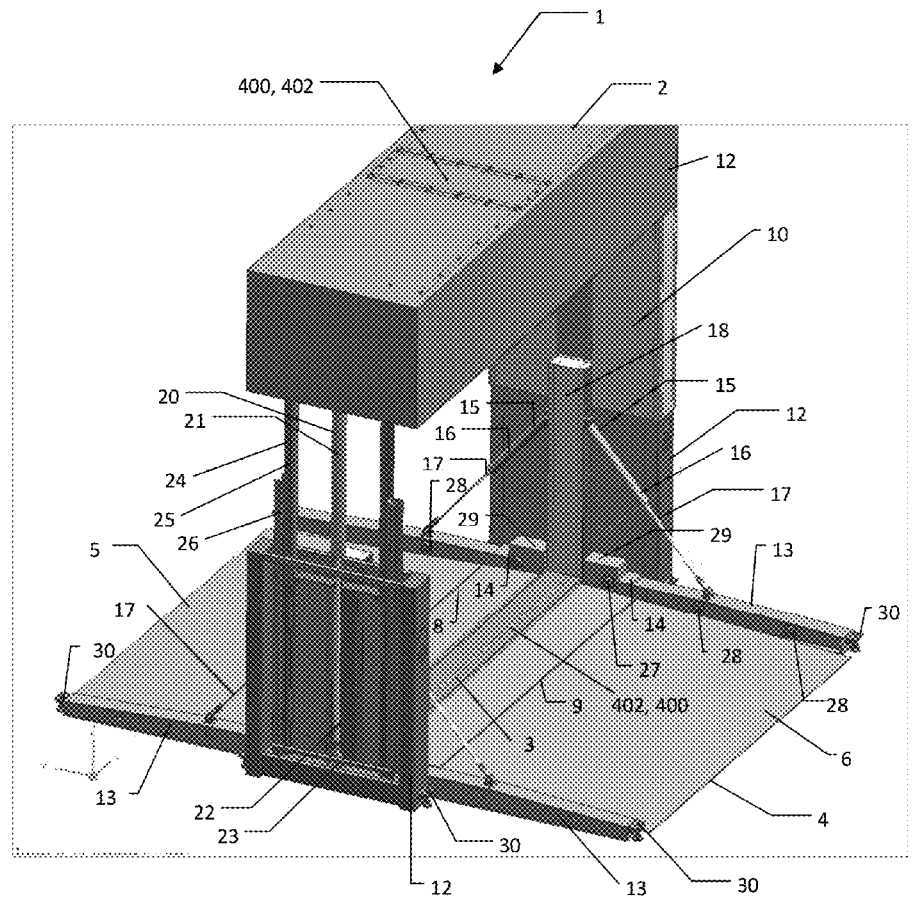
FIG. 1B illustrates an opposite side perspective view of the portable inspection apparatus of FIG. 1A.
Figure 4:
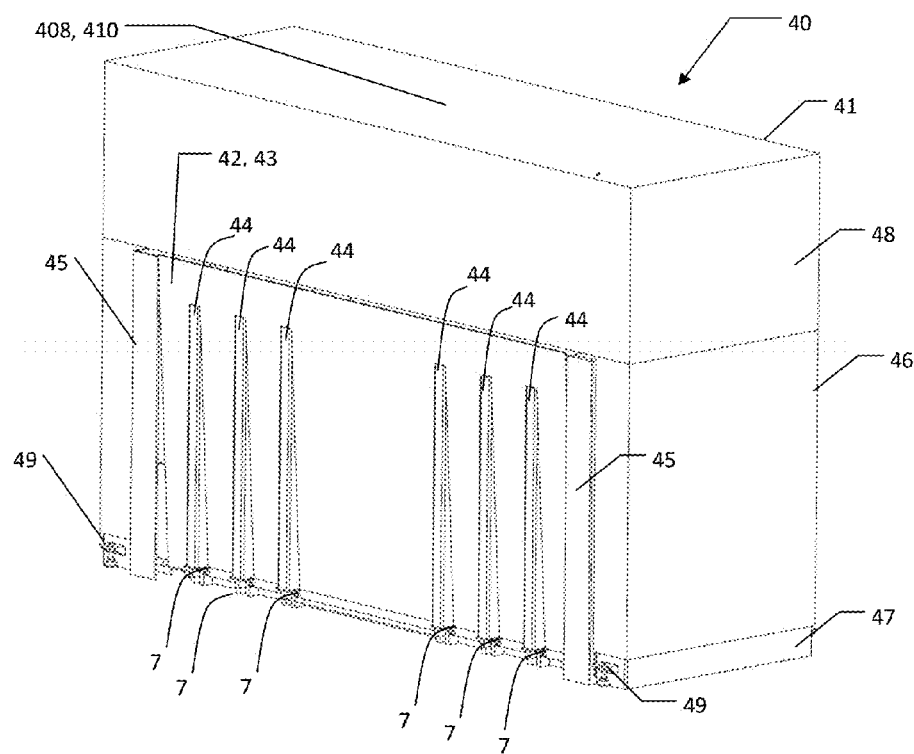
FIG. 4 illustrates a perspective view of a portable inspection apparatus in a stowed position.

FIGS. 1A and 1B are opposite-side perspective views of a portable inspection apparatus 1 (hereinafter the "apparatus 1") for placement in an inspection area and for inspection of vehicles passing through the inspection area. The apparatus 1 includes: a support structure 2 arranged to extend away from a surface of the inspection area, a base 3 for disposal on the surface, an inspection field generator (not shown), and a ramp 4 arranged to pivot relative the surface between a stowed position (as shown in FIG. 4) and a deployed position (as shown in FIGS. 1A and 1B) in which the ramp 4 extends away from the base 3 for allowing a vehicle to pass over the ramp 4 and the base 3 through the inspection field. The inspection field generator may include an emitter 400 disposed on the support structure 2 and a detector 402 disposed on the support structure 2 for generating an inspection field. However, it will be appreciated that various arrangements of the emitter 400 and the detector 402 are possible for generating an inspection field such as for example, the emitter 400 may be supported by one of the support structure 2 and the base 3, and the detector 402 may be supported by one of the support structure 2 and the base 3.

The ramp 4 may include a first ramp member 5 and a second ramp member 6. A plurality of pivots 7 (shown in FIG. 4) may be provided adjacent the ramp 4 for allowing the ramp 4 to pivot relative the surface between the stowed position and the deployed position. For example, the ramp 4 may be arranged to pivot relative to the surface by connecting the first ramp member 5 to a first side 8 of the base 3 by pivots 7 (shown in FIG. 4), and the second ramp member 6 to a second side 9 of the base 3 by pivots (not shown) similar to the pivots 7. The pivots 7 may include hinges, couplings or any other suitable pivoting mechanism that enables the ramp members 5, 6 to pivot relative to the surface of the inspection area between the deployed position and the stowed position. Further, the base 3 may be configured to house an emitter 400 and therefore may have a height above the surface of the inspection area. Therefore the ramp 4 also serves as a guide for guiding the vehicle over the ramp 4 and the base 3 through the inspection field.

The one of the emitter 400 and the detector 402 supported by the support structure 2 may be configured to move between a first position at a first distance from the base 3 and a second position at a second distance from the base 3.

For example, the support structure 2 may include two upper sections 10 and two lower sections 11, wherein each of the upper sections 10 is movable relative to each of the lower sections 11 between the first position and the second position. In the second position (as shown in FIG. 4), each of the upper sections 10 may be adapted for housing a part of the lower section 11. Alternatively, each of the lower sections 11 may be adapted for housing a part of the upper section 10. Still further, the support structure 2 may include a top section 12 attached to the upper sections 10 wherein the top section 12 may be for housing an emitter 400 or a detector 402 of the inspection field generator.

The apparatus 1 may include a plurality of beam members 13. Each of the beam members 13 may be arranged to pivot relative the surface between a stowed position and a deployed position in which the beam member 13 extends away from the base 3 for allowing a vehicle to pass over the ramp 4 and the base 3 through the inspection field. For example, two beam members 13 may be disposed adjacent and attached to opposite sides of the first ramp member 5 whereas another two beam members 13 disposed adjacent and attached to opposite sides of the second ramp member 6. Alternatively, the beam members 13 may be pivotally attached to the support structure 2 or the base 3 by a plurality of beam connectors 14 disposed on the surface and attached to the base 3 or the support structure 2. The beam connectors 14 may be shaped or configured for receiving the beam members 13 so as to allow the beam members 13 to pivot relative the surface between the stowed position and the deployed position.

The apparatus 1 may include a plurality of first drive systems 15 configured for moving the ramp 4 between the deployed position and the stowed position. Each of the first drive systems 15 may include a fluid actuated cylinder assembly 15 having a cylinder 16 and a piston 17 movable within the cylinder 16 to move the ramp 4 between the stowed position and the deployed position. The cylinder 16 may be attached to the support structure 2 by such as for example, a first auxiliary member 18 extending from the support structure 2. One end 19 of the piston 17 is attached to the ramp 4 by the beam member 13 (attached to each of the ramp members 5, 6) such that by driving the first drive assembly 15, the piston 17 reciprocates within the cylinder 16 to move the ramp 4 to extend away from the surface in the stowed position and to extend away from the support structure 2 in the deployed position. In an embodiment, the inspection field generator may include a detector 402 or an emitter 400 disposed on the first auxiliary member 18. Still further, a first one of a plurality of detectors 402 and an emitter 400 may be disposed on the first auxiliary member 18 and the base 3, and a second one of the plurality of detectors 402 and the emitter 400 may be disposed on the top section 12.

Still further, the apparatus 1 may include a second drive system 20 for moving the one of the emitter 400 and the detector 402 supported by the support structure 2 between the first position and the second position. For example, the second drive system 20 may be supported by the support structure 2. The apparatus 1 may have a plurality of second drive systems 20 on each side of the support structure 2. FIG. 1B illustrates a perspective view of the apparatus 1 whereby parts of the upper and lower sections 10, 11 of the support structure 2 are removed to show components of the second drive system 20. The second drive system 20 may be a fluid actuated cylinder assembly 20 disposed on the support structure 2. Each fluid actuated cylinder assembly 20 has a cylinder 21 and a piston 22 movable within the cylinder 21 for moving the support structure 2 between the first position and the second position. In an embodiment, the second drive system 20 may be disposed on the support structure 2 by attaching the cylinder 21 to the top section 12 and the piston 22 may be attached to the lower section 11. However, it is to be understood that the second drive system 20 may be operatively coupled on the support structure 2 in other ways to obtain movement of the support structure 2 between the first position and the second position.

One end 23 of the piston 22 may be attached to the lower section 11 such that by driving or actuating the second drive system 20, the piston 22 reciprocates within the cylinder 21 to move the upper section 10 together with the top section 12 to extend away from the surface in a first position at a first distance from the base 3 for setting up the apparatus 1. Similarly, the second drive system 20 may be actuated to retract the piston 22 so as to move the upper section 10 to a second position at a second distance from the base 3 in which the upper section 10 houses at least a part of or the whole of the lower section 11.

Referring to FIG. 1B, the apparatus 1 may further include a plurality of guide mechanisms 24 supported by the support structure 2 and adapted to guide movement of the support structure 2. For example, each of the guide mechanisms 24 may be disposed on opposite sides of the second drive system 20 wherein the second drive system 20 is substantially between the guide mechanisms 24. In an embodiment, the guide mechanism 24 may include a slider member 25 attached to the upper section 10 and a slider guide 26 or a guide member 26 adapted for guiding the slider member 25, such that when the piston 22 is extended, the slider member 25 slides along the slider guide 26 to guide the movement of the upper section 10. It will be appreciated that other guiding mechanisms such as linkage mechanisms or linear mechanisms that may be adapted to allow the upper section 10 to translate in a substantially vertical direction may be used in the apparatus 1 to guide the movement of the support structure 2.

The support structure 2 and the ramp 4 may be made of a rigid structural material such as steel or reinforced steel or the like. Referring to FIG. 1A, the ramp 4 may include one or more apertures 27 to allow bolting of the apparatus 1 onto a surface such as for example, a road surface. The apertures 27 may be disposed on the first and second ramp members 5, 6.

In addition, the apparatus 1 may include a bracket having an aperture for receiving a fastener for attaching the apparatus 1 to a surface. Still further, the apparatus 1 may include a sensor 28 or a plurality of sensors 28 for detecting any vehicle or any object on the ramp 4 or on the base 3. In an embodiment, the sensors 28 may be supported by the beam members 13 (as shown in FIGS. 1A and 1B) for detecting an object on the ramp 4. Alternatively, the sensors 28 may be supported by a plurality of second auxiliary members 29 extending from the support structure 2 for detecting an object on the base 3.

Figure 2:
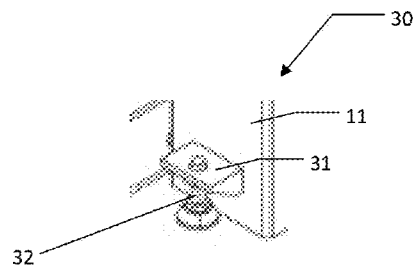
FIG. 2 illustrates a detailed view of a stabilizer bracket assembly used in a portable inspection apparatus.

As shown in FIGS. 1A and 1B, the apparatus 1 may include a plurality of stabilizer bracket assemblies ("stabilizers") 30 arranged for securing the support structure 2 to the road surface. One or more stabilizers 30 may be fixed to the apparatus 1 at each corner of the support structure 2 so as to level the apparatus 1 on any uneven road surface in the deployed position and/or in the stowed position. FIG. 2 shows a detailed view of the stabilizer 30 wherein the stabilizer 30 may include a bracket 31 fixed to an end of the lower section 11 of the support structure 2. The bracket 31 has an aperture for receiving a bolt and nut assembly 32 for bolting the apparatus 1 to the road surface.

Figure 3A:
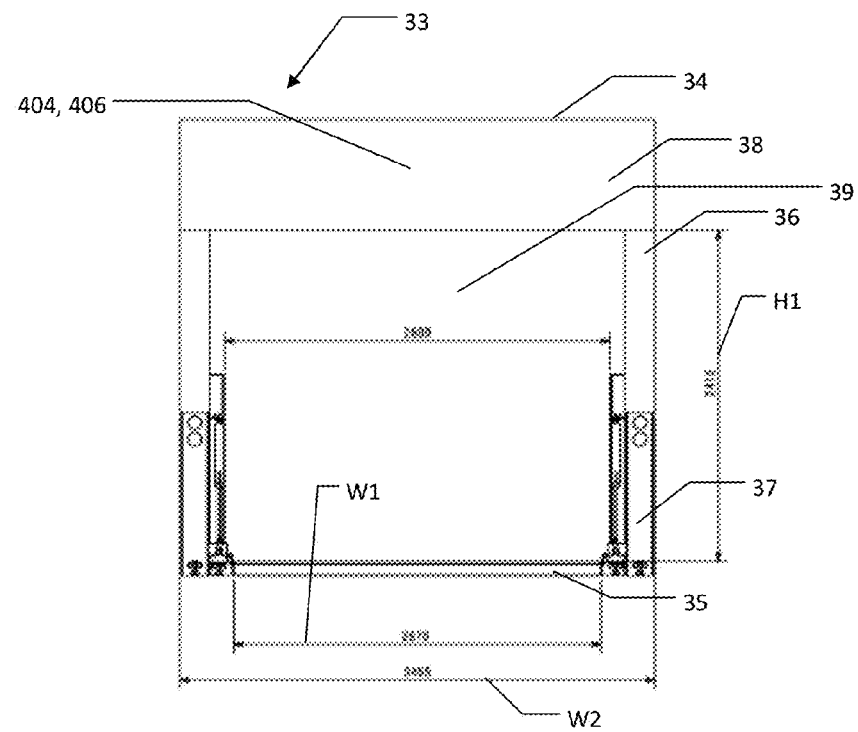
FIG. 3A illustrates a front view of a portable inspection apparatus in a deployed position.

FIG. 3A shows a front view of a portable inspection apparatus 33 according to an embodiment (hereinafter, the "apparatus 33"). The apparatus 33 has substantially the same components functioning in the same way as the components of the apparatus 1 of FIG. 1A and FIG. 1B. Specifically, the apparatus 33 includes: a support structure 34 arranged to extend away from a surface of the inspection area, a base (not shown) for disposal on the surface, an inspection field generator (not shown), and a ramp 35 arranged to pivot relative the surface between a stowed position (shown in FIG. 4) and a deployed position (as shown in FIGS. 1A and 1B) in which the ramp 35 extends away from the base for allowing a vehicle to pass over the ramp 35 and the base through the inspection field. For example, the support structure 34 may include two upper sections 36 and two lower sections 37.

The support structure 34 may include a top section 38 attached to the upper section 36 wherein the top section 38 may be for housing a first one of an emitter 404 and a detector 406. The second one of the emitter 404 and the detector 406 may be provided in the base.

Each of the upper sections 36 is movable relative to each of the lower sections 37 between a first position and a second position in the same manner as the support structure 2 of FIG. 1A. In the second position (as shown in FIG. 4), each of the upper sections 36 may be adapted for housing a part of the lower section 37. Alternatively, each of the lower sections 37 may be adapted for housing a part of the upper section 37.

Figure 3B:
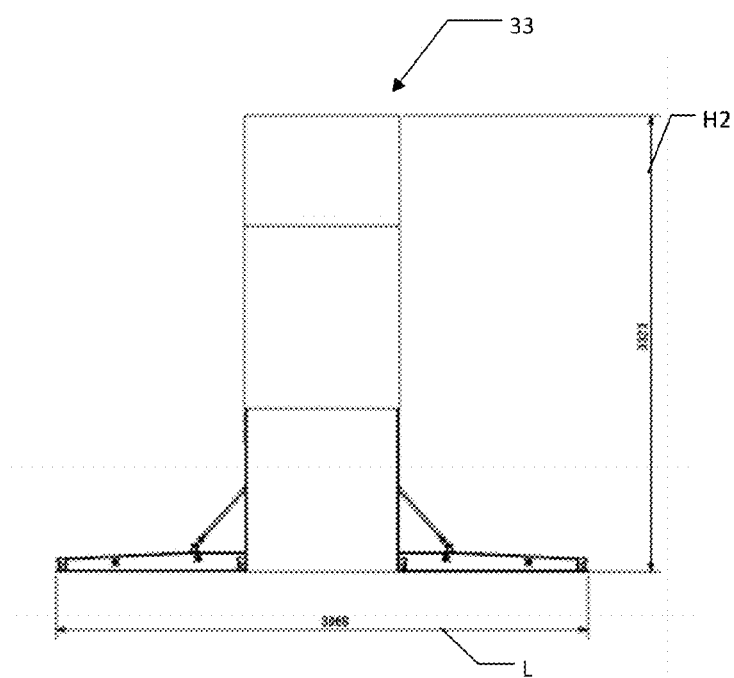
FIG. 3B illustrates a side view of the portable inspection apparatus of FIG. 3A.

In the first position, the upper section 36 may be extended away from the surface to move the first one of the emitter 404 and the detector 406 for generating an inspection field and to define a passageway 39 through which a vehicle can be passed over the ramp 35 and the base for inspection by the inspection field generator. The passageway 39 may have a height H1 and width W1. In an embodiment, the passageway 39 may have a height H1 of approximately 2145 mm and a width W1 of 2670 mm. The height H1 and the width W1 of the passageway 39 may be adjustable according to the size of the vehicle passing through for inspection. The overall width W2 of the apparatus 33 may be 3455 mm. FIG. 3B show a side view of the apparatus 33 where the apparatus 33 has a height H2 may be approximately 3323 mm dependent on a height of the support structure 34. The ramp 35 may have a length L of approximately 3800 mm to 3900 mm and may be varied according to the stability required in the apparatus 33 or the overall dimensions of the apparatus 33. It will be appreciated that the dimensions provided for the apparatus 33 such as the height H1, widths W1, W2 and L are for illustrative purposes and may be adjusted, increased or decreased according to the size and type of vehicle or object to be inspected.

FIG. 4 illustrates a perspective view of an embodiment of a portable inspection apparatus 40 (hereinafter the "apparatus 40") in a stowed position. Similar to the apparatus 1 of FIG. 1A, the apparatus 40 may include: a support structure 41 arranged to extend away from a surface of the inspection area, a base (not shown) for disposal on the surface, an inspection field generator (not shown), and a ramp 42 arranged to pivot relative the surface between the stowed position and a deployed position (as shown in FIGS. 1A and 1B) in which the ramp 42 extends away from the base for allowing a vehicle to pass over the ramp 42 and the base through the inspection field. The ramp 42 may include a first ramp member 43 and a second ramp member (not shown). A plurality of pivots 7 may be provided adjacent the ramp 42 for allowing the ramp 42 to pivot relative the surface between the stowed position and the deployed position.

As the surface of the inspection area upon which the apparatus 40 is placed may be uneven, each of the first and second ramp members 43 may include a plurality of ribs 44 (shown for the first ramp member 43) for supporting the ramp 42 on a surface of the inspection area. Each of the plurality of ribs 44 may have a tapered cross-section for allowing the ramp 42 to be at an inclined plane with respect to the surface and or the base.

The apparatus 40 may include a plurality of beam members 45. Each of the beam members 45 may be arranged to pivot relative the surface between a stowed position and a deployed position in which the beam member 45 extends away from the base (not shown) for allowing a vehicle to pass over the ramp 42 and the base through the inspection field. For example, two beam members 45 may be disposed adjacent and attached to opposite sides of the first ramp member 43 whereas another two beam members (not shown) disposed adjacent and attached to opposite sides of the second ramp member (not shown). Alternatively, the beam members 45 may be pivotally attached to the support structure 41 or the base by a plurality of beam connectors 46 disposed on the surface and attached to the base or the support structure 41. The beam connectors 46 may be shaped or configured for receiving the beam members 45 so as to allow the beam members 45 to pivot relative the surface between the stowed position and the deployed position.

The support structure 41 may include two upper sections 46 and two lower sections 47, wherein each of the upper sections 46 is movable relative to each of the lower sections 37 between a first position at a first distance from the base and a second position at a second distance from the base in the same manner as the support structure 2 of FIG. 1A. The support structure 41 may include a top section 48 attached to the upper section 46 wherein the top section 48 may be for housing an emitter 408 or a detector 410 of the inspection field generator. In the stowed position as shown in FIG. 4, each of the upper sections 46 may be adapted for housing a part of the lower section 47. An advantage is the reduction in the overall height of the apparatus 40 results in a compact design of the apparatus and a compact apparatus is easier to transport where there are space constraints in transportation. The apparatus 40 may include a plurality of stabilizer bracket assemblies ("stabilizers") 49 arranged for securing the support structure 41 to the road surface in a first position and the stabilizers 49 may be removed from the apparatus 40 prior to transportation to another inspection area or location.

Figure 5A:
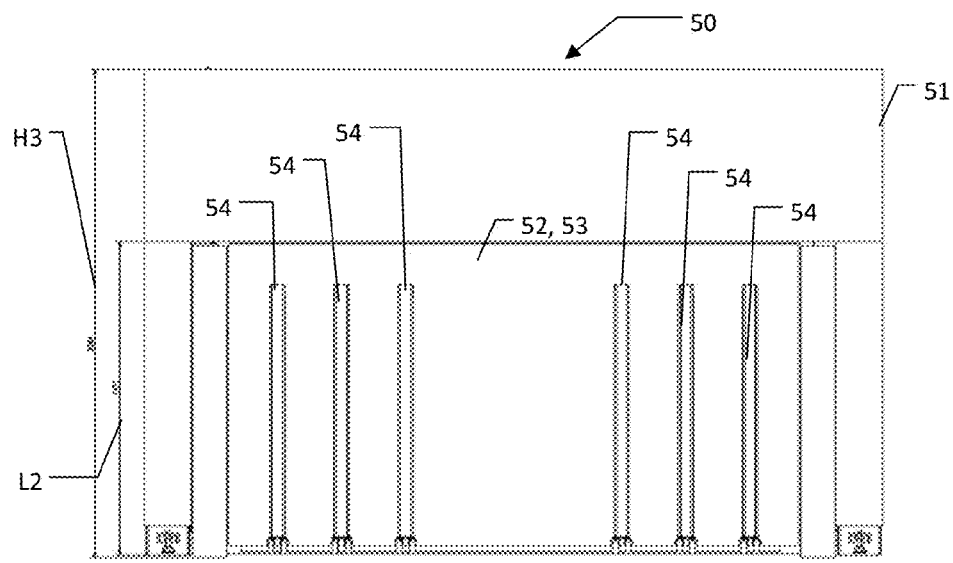
FIG. 5A illustrates a front view of a portable inspection apparatus in a stowed position.
Figure 5B:
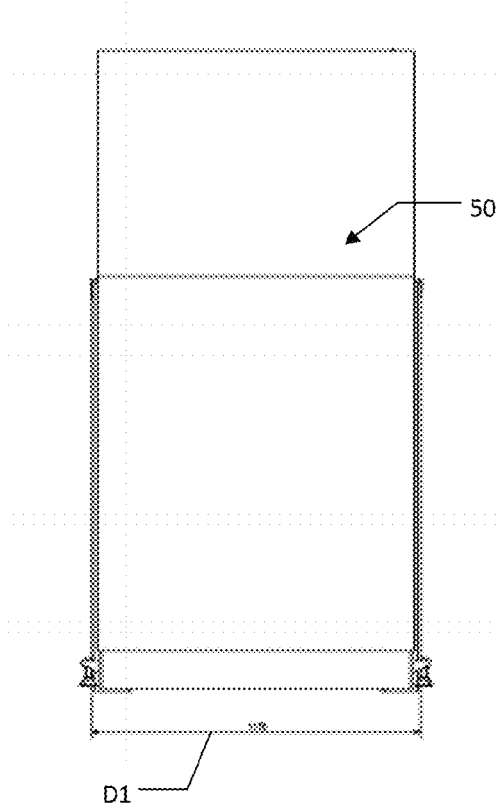
FIG. 5B illustrates a side view of the portable inspection apparatus of FIG. 5A.

FIGS. 5A and 5B show a front view and a side view of an embodiment of a portable inspection apparatus 50 (hereinafter, the "apparatus") in a stowed position. Similar to the apparatus 1 of FIG. 1A, the apparatus 50 may include: a support structure 51 arranged to extend away from a surface of the inspection area, a base (not shown) for disposal on the surface, an inspection field generator (not shown), and a ramp 52 arranged to pivot relative the surface between the stowed position and a deployed position (as shown in FIGS. 1A and 1B) in which the ramp 52 extends away from the base for allowing a vehicle to pass over the ramp 52 and the base through the inspection field. The ramp 52 may include a first ramp member 53 and a second ramp member (not shown). Each of the first and second ramp members 53 may include a plurality of ribs 54 (shown for the first ramp member 53) for supporting the ramp 52 on a surface of the inspection area. A plurality of pivots 55 may be provided adjacent the ramp 52 for allowing the ramp 52 to pivot relative the surface between the stowed position and the deployed position.

The apparatus 50 may have a height H1 of 3323 mm (as shown in FIG. 3B) in a first position which may be reduced to a height H3 of 2284 mm (as shown in FIG. 5A) in a second position. A length L2 of a ramp 52 such as for example, the length L2 of each of the first and second ramp members 53 may be adapted such that in a stowed position, the ramp 52 lies within or alongside the support structure 51. L2 may be for example, 1471 mm. FIG. 5B shows a side view of the apparatus 50 in the stowed position which snows that a depth D1 of the apparatus 50 may be 1170 mm.

Figure 6:
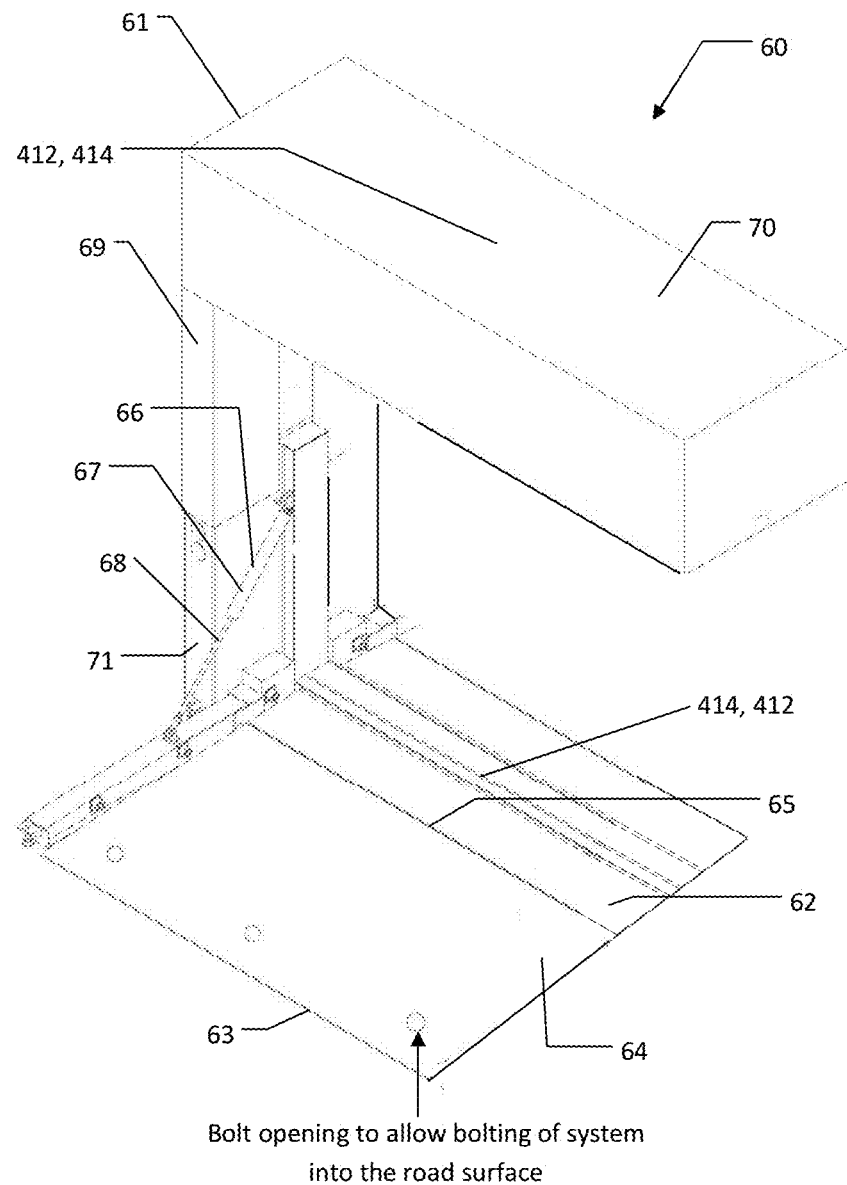
FIG. 6 illustrates a perspective view of a portable inspection apparatus in a deployed position.

FIG. 6 shows an alternative embodiment of a portable inspection apparatus 60 (hereinafter the "apparatus 60") in a deployed position. The apparatus 60 has a support structure 61 similar to the support structure 2 of the apparatus 1 of FIG. 1A and a base 62 similar to the base 3 of FIG. 1A, a ramp 63 having a ramp member 64, and an inspection field generator. The inspection field generator has an emitter 412 and a detector 414 wherein a first one of the emitter 412 and the detector 414 is supported by the support structure 61 and the second one of the emitter 412 and the detector 414 is supported by the base 62. The ramp 63 may be arranged to pivot relative the surface between a stowed position and a deployed position in which the ramp 63 extends away from the base 62 for allowing a vehicle to pass over the ramp 63 and the base 62 through the inspection field. The ramp member 64 may be connected to a side 65 of the base 62 by movable joints similar to the pivots 7 in FIG. 4, such that the ramp member 64 may pivot relative to the base 62 between the deployed position and the stowed position. For example, the apparatus 60 may comprise a first drive system 66 configured for moving the ramp 63 relative to the support structure 61 between the deployed position and the stowed position. The first drive system 66 may be a fluid actuated cylinder assembly 66 which includes a cylinder 67 and a piston 68 reciprocating or movable within the cylinder 67. The first drive system 66 may be actuated by a compressor (not shown) to extend and retract the piston 68 so as to move the ramp 63 between a stowed position and a deployed position.

The support structure 61 has an upper section 69 and a top section 70 attached to the upper section 69 forming a substantially an inverted L shape. The support structure 61 includes a lower section 71 whereby the upper section 69 is movable relative to the lower section 71 so as to cover a part of the lower section 71 in the stowed position for a reduction in overall height of the apparatus 60 for ease of transportation. Similar to the apparatus 1 of FIG. 1A and FIG. 1B, the apparatus 60 may comprise a second drive system (not shown) similar to the second drive system 20 of the apparatus 1 in FIG. 1B. The second drive system may be configured for moving the first one of the emitter 412 and the detector 414 supported by the support structure between the first position and the second position. An emitter 412 may be housed in the top section 70 and a detector 414 may be provided on the base 62 for generating an inspection field.

Figure 7:
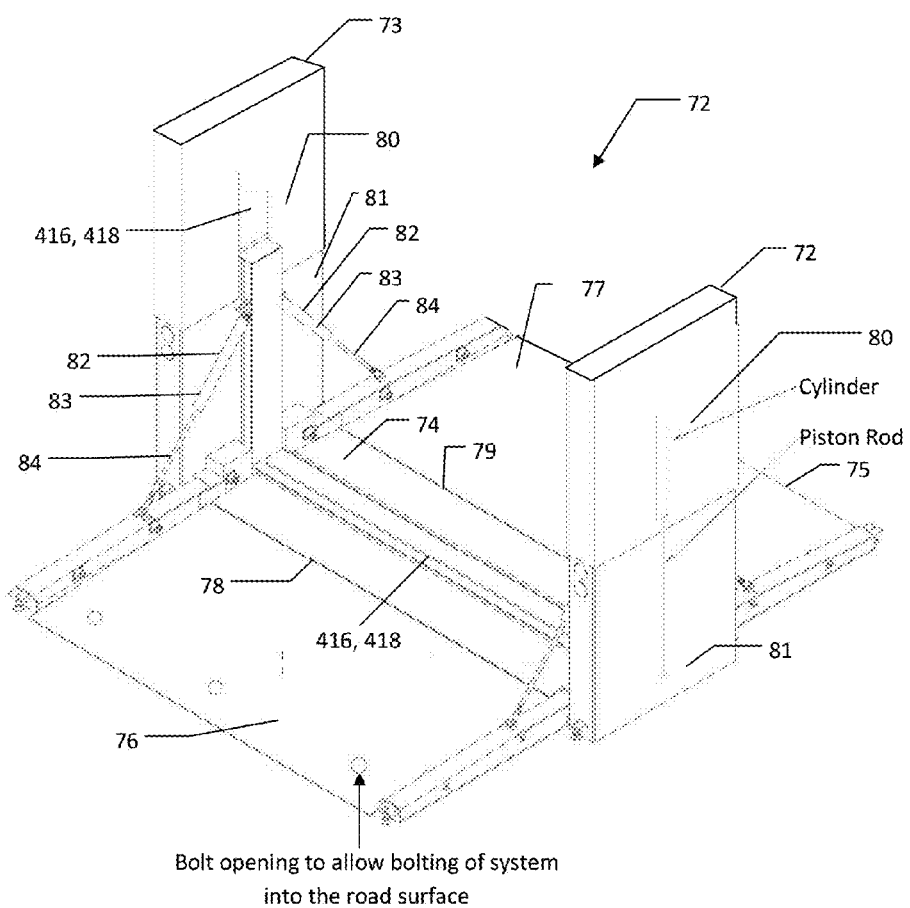
FIG. 7 illustrates a perspective view of a portable inspection apparatus in a deployed position.

In an embodiment, FIG. 7 illustrates a perspective view of a portable inspection apparatus 72 (hereinafter, the "apparatus 72") in a deployed position. The apparatus 72 has the same components as the apparatus of FIG. 1A, and FIG. 1B except for the top section 12. Specifically, the apparatus 72 includes: a support structure 73 arranged to extend away from a surface of the inspection area, a base 74 for disposal on the surface, an inspection field generator (not shown), and a ramp 75 arranged to pivot relative the surface between a stowed position (as shown in FIG. 4) and a deployed position in which the ramp 75 extends away from the base 73 for allowing a vehicle to pass over the ramp 75 and the base 74 through the inspection field. The inspection field generator has an emitter 416 disposed on the support structure 73 and a detector 418 disposed on the base 74 for generating an inspection field. However, it will be appreciated that various arrangements of the emitter 416 and the detector 418 are possible for generating an inspection field such as for example, the emitter 416 may be supported by the support structure 73 or the base 74, and the detector 418 may be supported by the support structure 73 or the base 74.

The ramp 75 may include a first ramp member 76 and a second ramp member 77. A plurality of pivots (not shown) may be provided adjacent the ramp 75 for allowing the ramp 75 to pivot relative the surface between the stowed position and the deployed position. For example, the ramp 75 may be arranged to pivot relative to the surface between the deployed position and the stowed position by connecting the first ramp member 76 to a first side 78 of the base 74 by pivots (not shown), and the second ramp member 77 to a second side 79 of the base 74 by pivots (not shown).

One of the emitter 416 and the detector 418 supported by the support structure 73 may be configured to move between a first position located at a first distance from the base 74 and a second position located at a second distance from the base 74. For example, the emitter 416 may be supported by the support structure 73.

For example, the support structure 73 may include two upper sections 80 and two lower sections 81, wherein each of the upper sections 80 is movable relative to each of the lower sections 81 between the first position and the second position. In the second position (as shown in FIG. 4), a first one of the upper sections 80 and the lower sections 81 may house a part of a second one of the upper sections 80 and the lower sections 81.

Further, the apparatus 72 may comprise a first drive system 82 configured for moving the ramp 75 relative to the support structure 73 between the deployed position and the stowed position. The first drive system 82 may be a fluid actuated cylinder assembly 82 which includes a cylinder 83 and a piston 84 reciprocating or movable within the cylinder 83. The first drive system 82 may be actuated by a compressor (not shown) to extend and retract the piston 84 so as to move the ramp 75 between a stowed position and a deployed position.

To move the emitter 416 between the first position and the second position, the apparatus 72 may comprise a second drive system (not shown) similar to the second drive system 20 of the apparatus 1 in FIG. 1B. The second drive system may be adapted for moving the support structure 72 between the first position and the second position. The second drive system may be for example, a mechanical drive system disposed on or within the support structure 73. The mechanical drive system may be a motor and ball screw assembly, a chain actuator assembly, or linear motor actuator assembly.

Figure 8:
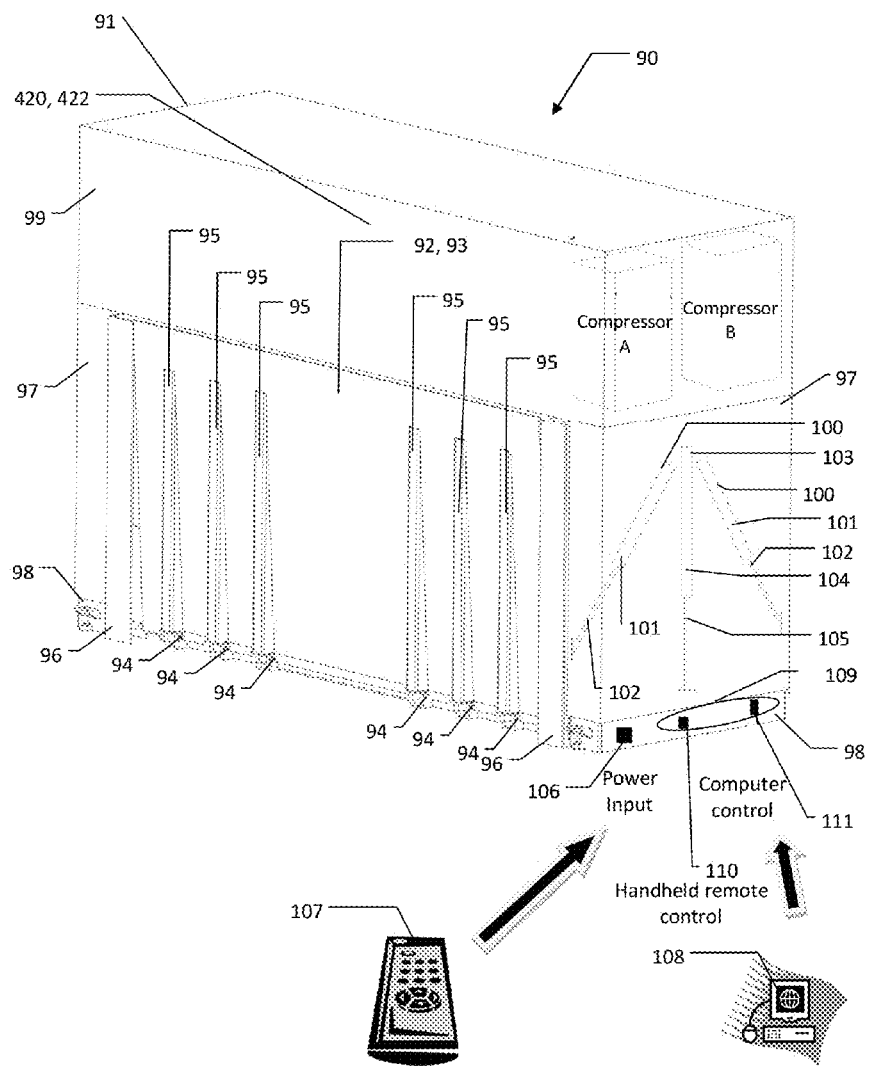
FIG. 8 illustrates a perspective view of a portable inspection apparatus in a stowed position.

In the above embodiments where the first and second drive systems are power drive systems such as fluid actuated cylinder assemblies, the portable inspection apparatus may include separate compressors for actuating the drive systems. FIG. 8 illustrates a perspective view of a portable inspection apparatus 90 (hereinafter the "apparatus 90") in a stowed position. The apparatus 90 may include: a support structure 91 arranged to extend away from a surface of the inspection area, a base (not shown) for disposal on the surface, an inspection field generator (not shown), and a ramp 92 arranged to pivot relative the surface between the stowed position and a deployed position (as shown in FIGS. 1A and 1B) in which the ramp 92 extends away from the base for allowing a vehicle to pass over the ramp 92 and the base through the inspection field. The inspection field generator may include an emitter 420 and a detector 422 for generating an inspection field wherein a first one of the emitter 420 and the detector 422 is supported by the support structure 91 and the second one of the emitter 420 and the detector 422 is supported by the base.

The ramp 92 may include a firs ramp member 93 and a second ramp member (not shown). A plurality of pivots 94 may be provided adjacent the ramp 92 for allowing the ramp 93 to pivot relative the surface between the stowed position and the deployed position. Each of the first and second ramp members 93 may include a plurality of ribs 95 (shown for the first ramp member 93) for supporting the ramp 92 on a surface of the inspection area. Each of the plurality of ribs 95 may have a tapered cross-section for allowing the ramp 92 to be at an inclined plane with respect to the surface and or the base. The apparatus 90 may include a plurality of beam members 96 arranged to pivot relative the surface between a stowed position and a deployed position in which each of the beam members 96 extends away from the base (not shown) for allowing a vehicle to pass over the ramp 92 and the base through the inspection field.

The first one of the emitter 420 and the detector 422 supported by the support structure 91 may be arranged to move between a first position located at a first distance from the base and a second position located at a second distance from the base. For example, the support structure 91 may include two upper sections 97 and two lower sections 98, wherein each of the upper sections 97 is movable relative to each of the lower sections 98 between the first position and the second position. In the stowed position (as shown in FIG. 8), each of the upper sections 97 may be adapted for housing a part of the lower section 98. A top section 99 may be attached to the upper sections 97 for supporting an emitter 420 or a detector 422 of the inspection field generator.

Further, the apparatus 90 may comprise a plurality of first drive systems 100 configured for moving the ramp 92 between the deployed position and the stowed position. The first drive system 100 may be a fluid actuated cylinder assembly 100 which includes a cylinder 101 and a piston 102 reciprocating or movable within the cylinder 101. To move the support structure 91 between the deployed position and the stowed position, the apparatus 90 may comprise a plurality of second drive systems 103 similar to the second drive system 20 of the apparatus 1 in FIG. 1B. For example, the second drive system 103 may include a cylinder 104 and a piston 105 reciprocating or movable within the cylinder 104.

Additionally, the apparatus 90 may include a first compressor A for actuating the plurality of first drive systems 100 and a second compression B for actuating the plurality of second drive systems 103. The first compressor A may have a plurality of outputs (not shown) wherein each output may be connectable to the cylinder 101 for actuating each first drive system 100. Similarly, the second compressor B may have a plurality of outputs (not shown) wherein each output may be connectable to the cylinder 104 of the second drive system 103. Alternatively, a compressor (not shown) may be installed in a top section 99 of the support structure 91 whereby the compressor may have a plurality of outputs connectable to each of the first and second drive systems 100, 103 to actuate the drive systems 100, 103 respectively such that the ramp 92 and the support structure 91 are movable separately.

A power input socket 106 may be disposed in the apparatus 90, for example in the support structure 91. The apparatus 90 may set up in a deployed position or arranged to be in a stowed position by selecting a function corresponding to one of: moving the ramp 92 or moving the support structure 91 from an input terminal coupled to the apparatus 90. The input terminal may be a handheld remote control 107 with selectable switches which can activate movement of the ramp 92 and the support structure 91 separately, or a computer 108 having an input interface whereby the computer 108 is configured for sending control signals corresponding to an input provided to the input interface to activate movement of the ramp 92 and the support structure 91. The movement of the ramp 92 or the support structure 91 can be controlled by a controller 109 being configured for:

receiving a first control signal from a control system (not shown) to control movement of the ramp 92 between the deployed position and the stowed position; and receiving a second control signal from the control system to control movement of the support structure 91 between the deployed position and the stowed position.

The controller 109 may have two selectable control modes such as a remote control mode or a computer control mode. For example, the controller 109 may include a remote control input interface 110 configured to receive a signal from the handheld remote controller 107, and/or an input interface 111 configured to receive a control instruction from the computer 108. For example, the handheld controller 107 or the computer 108 may have a plurality of inputs or selectable switches which can activate the compressors A and B separately to open or close the apparatus 90. The selectable switches may be configured to perform any of the following functions including:

Function A—"Compressor A open" relates to opening of the compressor A to actuate the plurality of first drive systems 100 to an extended position to extend the ramp 92 away from the base for allowing a vehicle to pass over the ramp 92 and the base through the inspection field;

Function B—"Compressor A close" relates to closing of the compressor A to actuate the plurality of first drive systems 100 to a retracted position to move the ramp 92 to lie alongside the support structure 91 in a stowed position such as for example as shown in FIG. 8;

Function C—"Compressor B open" relates to opening of the compressor B to actuate the plurality of second drive systems 103 to an extended position to move the support structure 91 to be extended away from the base or a surface;

Function D—"Compressor B close" relates to closing of the compressor B to actuate the second drive systems 103 to an retracted position to move the support structure 91 to a stowed position in which the upper section 97 houses a part of the lower section 98;

Emergency Stop relates to stopping of the compressor A and/or the compressor B.

Alternatively, the operation of the apparatus 90 can be achieved in a computer control mode, via interfacing to a computer configured for controlling the apparatus 90. The computer can send control signals corresponding to Functions A, B, C, D described in the above remote control mode to activate the selectable compressors A and B to perform the operation of the apparatus 90.

To set up the apparatus 90 in a deployed position, a user may select an input corresponding to Function A to move the ramp 92, and an input corresponding to Function C to move the support structure 91. When Function A is selected to open the compressor A, the compressor A will pump an incompressible fluid into each cylinder 101 of each of the first drive systems 100 causing the piston rod 102 within each of the cylinders 101 to extend and push the ramp 92 toward the road surface.

To close the apparatus 90, i.e. to move the apparatus from a deployed position to a stowed position, a user may select an input corresponding to Function B, followed by an input corresponding to Function D. When closing of the compressor B (corresponding to Function D) is selected, the compressor B will send a reverse pressure to the second drive systems 103 causing the piston rod 105 in each of the drive systems 103 to retract and move the support structure 91 to a stowed position in which a portion of the lower section 98 is within the upper section 97 in a stowed position. When Function B is selected, the compressor A will send a reverse pressure to the first drive systems 100. The will cause the piston rod 102 in each of the cylinders 101 to retract and move the ramp 92 to a substantially vertical position towards the support structure 91 in a stowed position.

When Function C is selected to open the compressor B, the compressor B will apply pressure to the second drive systems 103 by pumping an incompressible fluid into each cylinder 104 in the second drive systems 103 such that the piston rod 105 within each cylinder 104 will be extended to extend the support structure 91 to an extended position. In both first and second drive systems 100, 103, the cylinders may contain incompressible fluid may include oil, or any similar fluid suitable for use in a hydraulic cylinder.

In an embodiment, the portable inspection apparatus 90 may also include a safety sensor (not shown) to detect any vehicle in the apparatus 90 before a switch or control can be activated to actuate the apparatus to a stowed position. Still further, the controller 109 may be configured to receive a signal corresponding to a detected object or a vehicle, and programmed such that the functions corresponding to moving the support structure 91 and the ramp 92 to a stowed position such as Functions B, D cannot be activated to prevent accidental activation while an operator or any object or any vehicle is present in the inspection area. For example, in the computer mode, the user interface corresponding to the Functions B, D may not be selectable.

It will be appreciated that the above description describes one of the ways to operate the portable inspection apparatus 90 and that the sequence of operation of the portable inspection apparatus 90 may be varied such as for example, activating the support structure 91 before or after activating the ramp 92.

Figure 9:
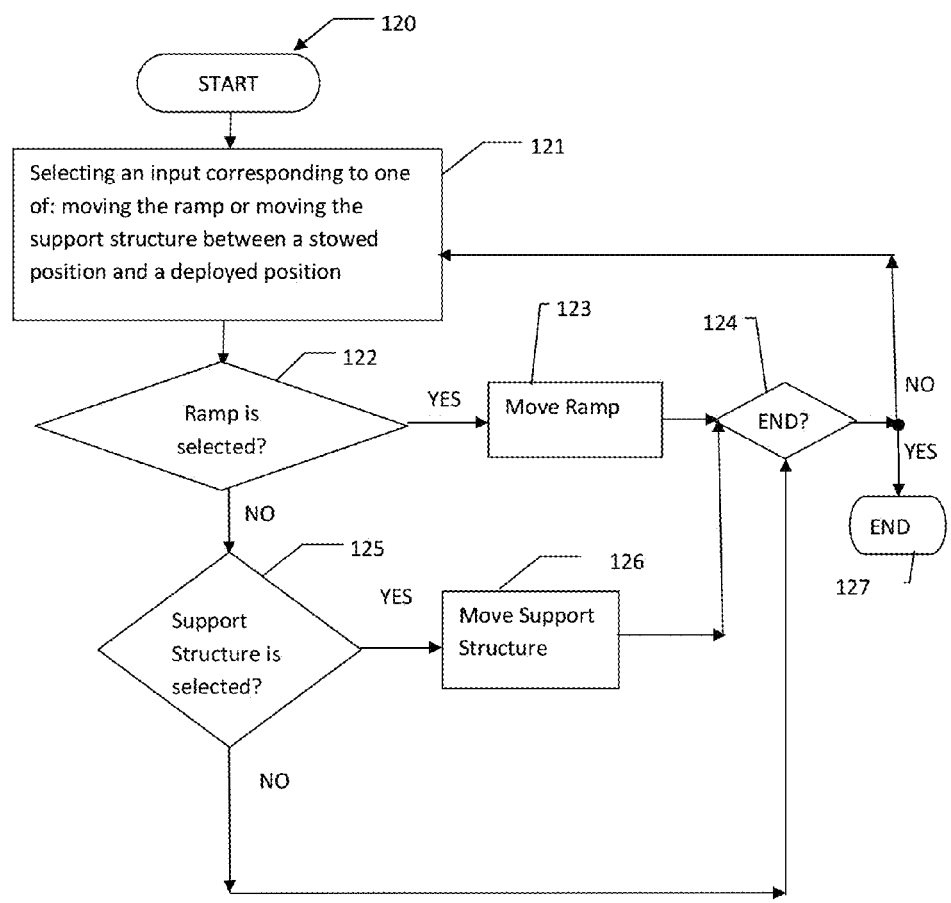
FIG. 9 is a flow chart illustrating a method of operating a portable inspection apparatus for inspecting vehicles.

When a portable inspection apparatus is required to be deployed in an inspection site for conducting inspection of vehicles, the portable inspection apparatus in a stowed position is transported to the inspection site to be deployed for inspecting vehicles. FIG. 9 is a flow chart illustrating a method 120 of operating a portable inspection apparatus for inspecting vehicles. For ease of reference, the method 120 is described with reference to the apparatus 90 of FIG. 8, although it will be understood by the person skilled in the art that the method 120 may be applied for any embodiment of a portable inspection apparatus herein described. The method 120 may begin through connecting a power supply to the apparatus 90 via a power input socket 106 located in the apparatus 90. The apparatus 90 for may set up in a deployed position or arranged to be in a stowed position by selecting a function from an input terminal coupled to the apparatus 90 in step 121, whereby the function corresponds to one of: moving the ramp 92 or moving the support structure 91. The input terminal may be a handheld remote control 107 with selectable switches which can activate movement of the ramp 92 and the support structure 91 separately, or a computer 108 having an input interface whereby the computer 108 is configured for sending control signals corresponding to an input provided to the input interface to activate movement of the ramp 92 and the support structure 91. In step 122, it is determined if the ramp 92 is selected. In step 125, it is determined if the support structure 91 is selected. When it is determined in step 122 that an input corresponding to moving the ramp 92 is selected, a first drive system 100 may be activated to move the ramp 92 in step 123. In step 124, it is determined if the operation of the portable inspection apparatus 90 is complete. If the operation of the portable inspection apparatus 90 is not complete, the method returns to step 121. When it is determined in step 125 that an input corresponding to moving the support structure 91 is selected, a second drive system 103 may be activated to move the support structure 91 in step 126. When it is determined in step 124 that the operation of the portable inspection apparatus 90 is complete, the operation of the portable inspection apparatus 90 ends in step 127.

It is to be understood that the step 126 of moving the support structure 91 in a deployed position may be performed prior to the step 123 of moving the ramp 92 in a deployed position or vice versa. However, it will be appreciated that moving the ramp 92 so as to extend the ramp 92 away from the support structure 91 towards the road surface prior to moving the support structure 91 may increase the stability of the portable inspection apparatus 90 in the deployed position. Similarly, in a stowed position of the portable inspection apparatus 90 as shown in FIGS. 4, 5A, 5B and 8, the step 126 of moving the support structure 91 may be performed prior to the step 123 of moving the ramp 92 or vice versa. Alternatively, other stabilizing mechanisms may be used to stabilize the portable inspection apparatus, including stabilizer bracket assemblies, or bolt assemblies adapted for securing or bolting the ramp to the road surface. Such stabilizing mechanisms may also be used to level the portable inspection apparatus on an uneven road surface.

Figure 10:
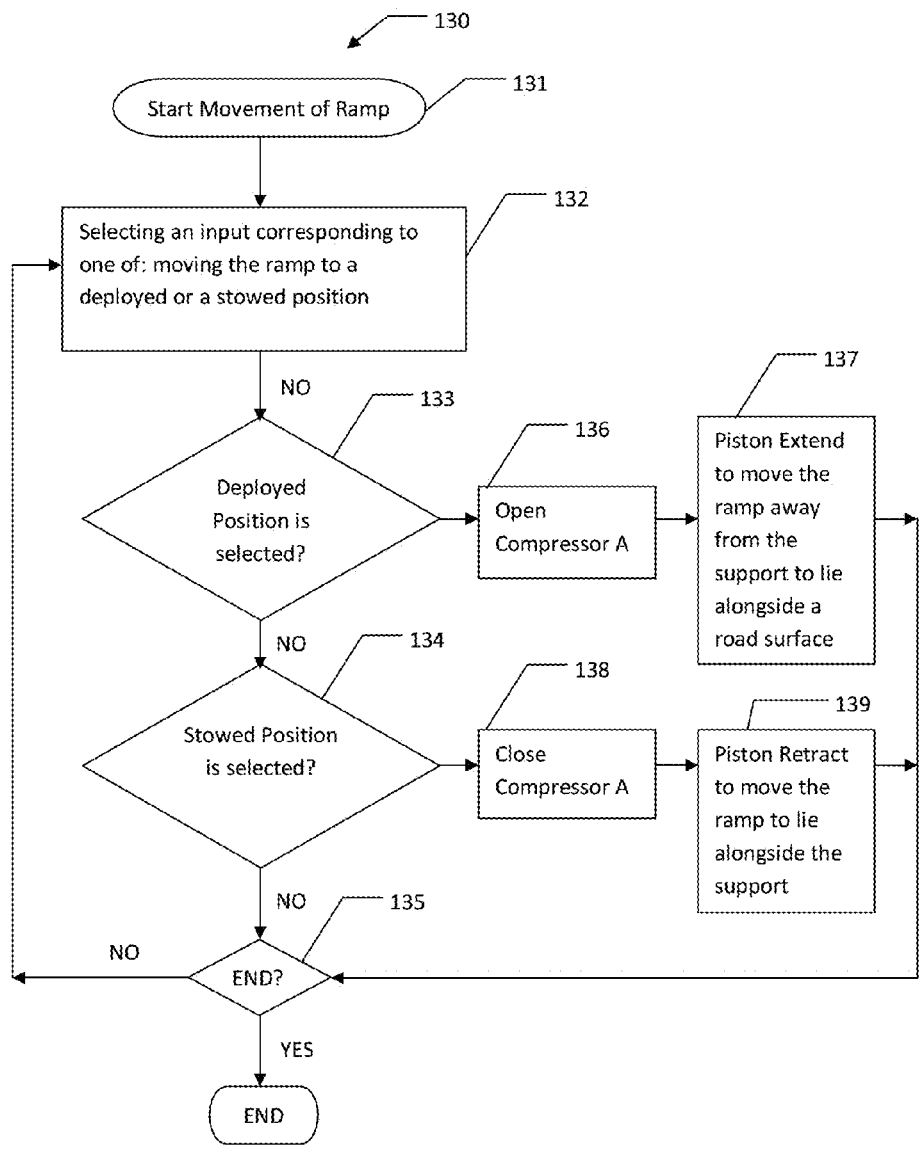
FIG. 10 is a flowchart illustrating a method of moving the ramp performed in the step 83 of FIG. 9.

FIG. 10 is a flowchart illustrating a method 130 of moving the ramp performed in the step 123 of FIG. 9. With reference to the portable inspection apparatus 90 of FIG. 8, the method 130 may begin in step 131 through activating a driving source Compressor A for driving a first driving system 100 coupled to the ramp 92. The ramp 92 may be moved between a deployed position and a stowed position in step 132 by selecting an input corresponding to one of: moving the ramp 92 to a deployed position or a stowed position from an input terminal as described for FIG. 9. In step 133, it is determined if a deployed position of the ramp 92 is selected. In step 134, it is determined if a stowed position of the ramp 92 is selected. When it is determined in step 133 that an input corresponding to moving the ramp 92 to a deployed position is selected, a first drive system 100 is activated by opening a compressor A in step 136 to allow fluid such as oil to be pumped into cylinders 101 of the first drive system 100 no as to cause pistons 102 within the cylinders 101 to extend to move the ramp 92 to a deployed position in step 127 whereby the ramp 92 extends away from the base for allowing a vehicle to pass over the ramp 92 and the base through the inspection field. In step 135, it is determined if the movement of the ramp is complete. If the movement of the ramp is not complete, the method 130 returns to step 132. When it is determined in step 134 that an input corresponding to moving the ramp 92 to a stowed position is selected, the first drive system 100 is activated by closing the compressor A in step 138. Closing the compressor A sends a reverse pressure to the cylinders 101 of the first drive system 100 to retract the pistons 102 within the cylinders 101 to move the ramp 92 to lie alongside the support structure 91 in step 139. When it is determined in step 135 that the operation of the portable inspection apparatus 90 is complete, the movement of the ramp is ended.

Figure 11:
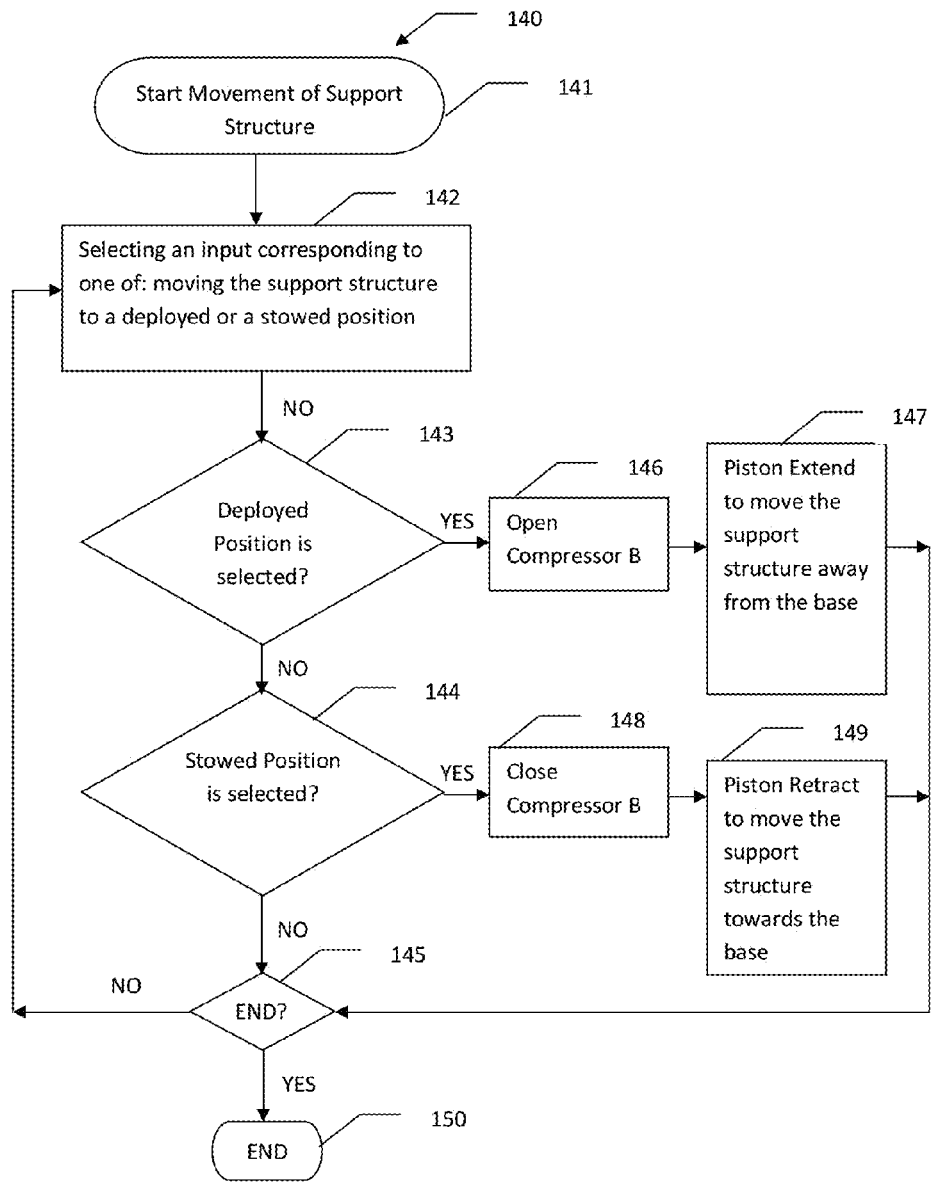
FIG. 11 is a flowchart illustrating a method of moving the support structure performed in the step 86 of FIG. 9.

FIG. 11 is a flowchart illustrating a method 140 of moving the support structure performed in the step 126 of FIG. 9. With reference to the portable inspection apparatus 61 of FIG. 8, the method 140 may begin in step 141 through activating a driving source such as Compressor B for driving a second driving system 103 coupled to the support structure 91. The support structure 91 may be moved between a deployed position and a stowed position in step 142 by selecting an input corresponding to one of: moving the support structure 91 to a deployed position or a stowed position from an input terminal as described for FIG. 9. In step 143, it is determined if a deployed position of the support structure 91 is selected. In step 144, it is determined if a stowed position of the support structure 91 is selected. When it is determined in step 143 that an input corresponding to moving the support structure 91 to a deployed position is selected, a second drive system 103 is activated by opening a compressor B in step 146. Opening the compressor B allows fluid such as oil to be pumped into cylinders 104 of the second drive system 103 so as to cause pistons 105 within the cylinders 104 to extend to move the support structure 91 away from the base in step 147 so that the support structure 92 is extended away from the base to define a passageway through which an vehicle can be passed through for inspection by an inspection field generator (not shown). In step 145, it is determined if the movement of the support structure 91 is complete. If the movement of the support structure 91 is not complete, the method 100 returns to step 102. When it is determined in step 144 that an input corresponding to moving the support structure 91 to a stowed position is selected, the second drive system 103 is activated by closing the compressor B in step 148. Closing the compressor B sends a reverse pressure to the cylinders of the second drive system 103 to retract the pistons 105 within the cylinders 104 to move the support structure 91 towards the base in step 149. When it is determined in step 145 that the operation of the portable inspection apparatus 90 is complete, the movement of the support structure 91 is ended in step 150.

For ease of description, the methods 130, 140 have been described with reference to the apparatus 90 of FIG. 8 wherein the driving sources are fluid compressors, and the first and second driving systems are a plurality of fluid actuated cylinders. The driving sources may include air compressors, oil/hydraulic compressors, AC/DC motors and therefore the first driving system may include fluid actuated cylinders, electric motorised drive systems or any power drive system adapted for moving the support structure. For example, fluid actuated cylinder assemblies may include hydraulic cylinders (sometimes known as fluid/oil cylinders) or pneumatic cylinders (sometimes known as air cylinders). Pneumatic cylinders utilize the power of compressed gas to produce a force in a reciprocating linear motion, and correspondingly, the compressors will be installed to drive the pneumatic cylinders.

Although power drive systems such as fluid actuated cylinder assemblies are illustrated in the embodiments, it will be appreciated that other drive systems such as motorized drive systems, pulley drive systems, electric drive systems, manual drive systems may be used to actuate or move the ramp or the support structure in any of the abovementioned embodiments of a portable inspection apparatus.

For example, a portable inspection apparatus may be operated manually in a partial manual mode and a full manual mode. In an embodiment, a ramp and/or a support structure may be operated in a partial manual mode or a full manual mode. Embodiments of the portable inspection apparatus operable in the partial manual mode and the full manual mode will be described in the following description and with reference in FIG. 12 to FIG. 15. It will be appreciated that the portable inspection apparatus herein described may have substantially the same components in the abovementioned embodiments, such as a support structure, a ramp, an inspection field generator and a base.

Figure 12:
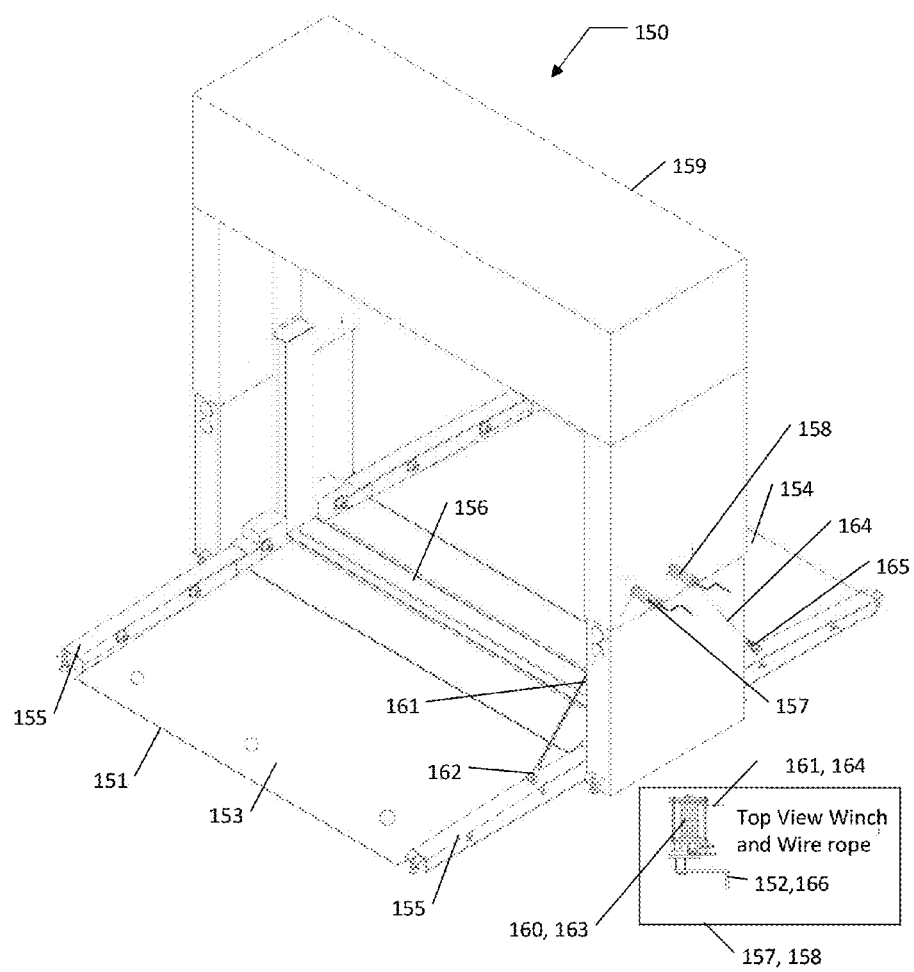
FIG. 12 illustrates a perspective view of a portable inspection apparatus in a deployed position whereby the ramp may be operated in a partial manual mode.

FIG. 12 illustrates a perspective view of a portable inspection apparatus 150 (hereinafter, the "apparatus 150") in a deployed position. The apparatus 150 has a similar configuration to the apparatus 1 of FIG. 1A except that the apparatus 150 may be configured to operate in a partial manual mode by including a manual drive system instead of a power drive system or a first drive system for moving a ramp 151 in the apparatus 150. The ramp 151 includes a first ramp member 153 and a second ramp member 154 opposite the first ramp member 153. The ramp 151 may include a plurality of beam member 155 provided adjacent the ramp 151 and arranged to pivot relative the surface between a stowed position and a deployed position in which the beam members 155 extend away from a base 156 for allowing a vehicle to pass over the ramp 151 and the base 156 through the inspection field. For example, the manual drive system may include first and second lifting mechanisms 157, 158 supported by a support structure 159 of the portable inspection apparatus 150. The first lifting mechanism 157 may be for example, a winch consisting of a drum 160 and a cable or a wire rope 161 extending from the drum 160 wherein one end 162 of the wire rope 161 is attached to the beam member 155 disposed adjacent the first ramp member 153. A hand crank 152 is attached to the drum 160 such that by rotating the hand crank 152, the first ramp member 153 may pivot relative the surface between a stowed position and a deployed position. Similarly, the second lifting mechanism 158 consists of a drum 163 and a cable or a wire rope 164 extending from the drum 163 wherein one end 165 of the wire rope 164 is attached to the beam members 155 disposed adjacent the second ramp member 154. A hand crank 166 is attached to the drum 163 such that by rotating the hand crank 166, the second ramp member 164 may pivot relative the surface between a stowed position and a deployed position. The portable inspection apparatus 150 may be operated by one operator to control the movement of the ramp 151. Alternatively, four lifting mechanisms (not shown) may be provided such that two lifting mechanisms are on each side of the support structure 159 and the deployment of the ramp 151 may be controlled by two operators. The support structure 159 may be operated in the same way as the support structure 2 of FIGS. 1A, 1B.

Figure 13:
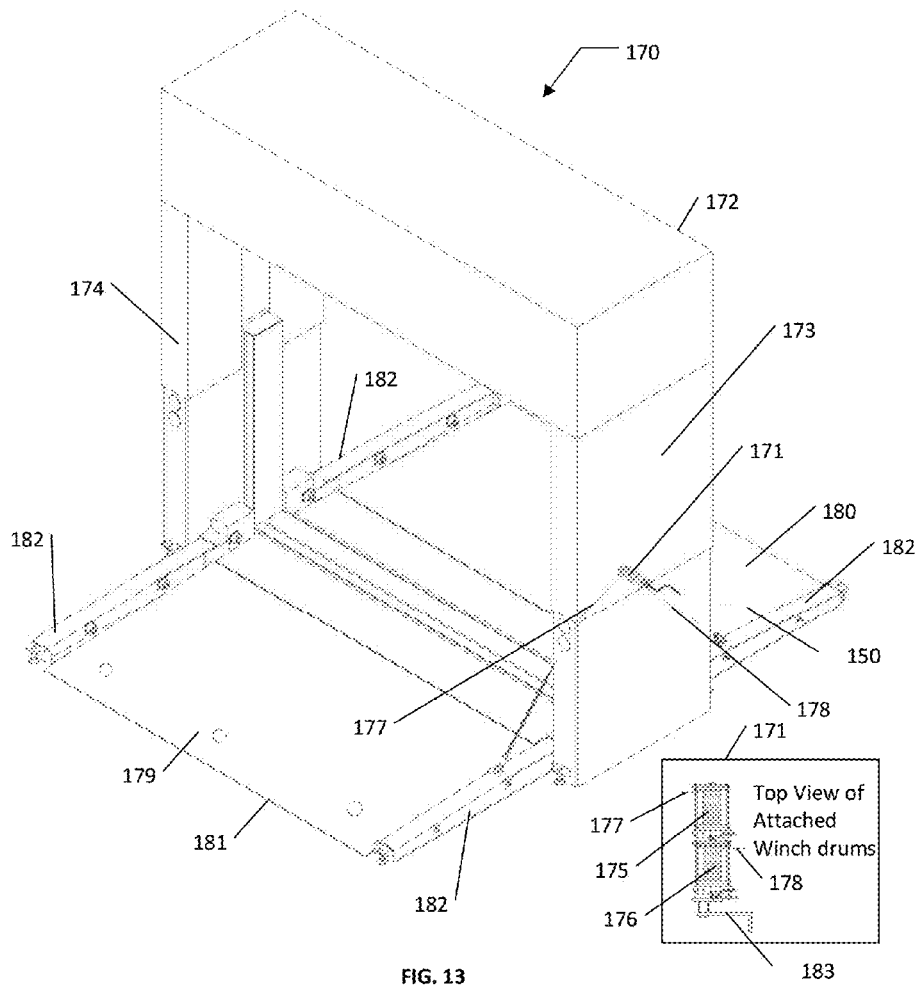
FIG. 13 illustrates a perspective view of a portable inspection apparatus in a deployed position whereby the ramp may be operated in a partial manual mode.

FIG. 13 illustrates a perspective view of a portable inspection apparatus 170 in a deployed position. The portable inspection apparatus 170 is similar in configuration to the portable inspection apparatus 1 of FIG. 1A except that the portable inspection apparatus 170 has a lifting mechanism 171 for moving a support structure 172 instead of a second drive system 20. The lifting mechanism 171 may be supported by the support structure 172 on a first side 173 of the support structure 172. Another lifting mechanism similar to the lifting mechanism 171 may be attached to another side 174 of the support structure 172 opposite the first side 173. The difference between the lifting mechanism 171 and the lifting mechanisms 155, 156 of the apparatus 150 in FIG. 12 is that the lifting mechanism 171 has two drums 175, 176 whereby cables 177, 178 may extend from each of the two drums 175, 176 and one end of each cable 177, 178 may be attached to beam members 182 disposed adjacent each first and second ramp member 179, 180 of a ramp 181 respectively. The advantage of this configuration is the ramp members 179, 180 can be deployed or stowed at the same time in a single hand action by rotating a hand crank 183 attached to the lifting mechanism 171. Although the lifting mechanism 171, 155, 156 is described to be operated manually by the user in a partial manual mode of the apparatus 170, it will be appreciated that the lifting mechanism may include gear assemblies and can be modified to be powered by electric, hydraulic, pneumatic or internal combustion drives. Further, the lifting mechanism 171, 155, 126 may include a solenoid brake and/or a mechanical brake or a ratchet and pawl device for preventing the cable of the lifting mechanism 171, 155, 156 from unwinding unless the pawl is retracted.

Figure 14:
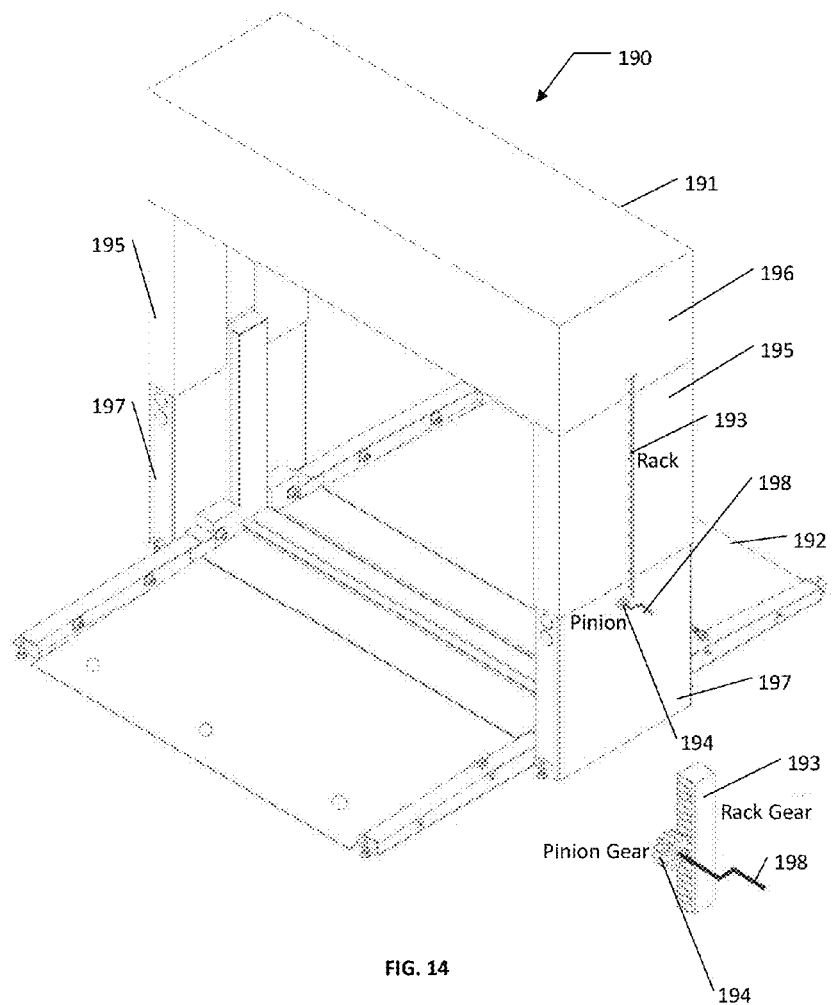
FIG. 14 illustrates a perspective view of a portable inspection apparatus in a deployed position whereby the support structure may be operated in a partial manual mode and the ramp may be operated in a fully manual mode.

FIG. 14 illustrates a perspective view of a portable inspection apparatus 190 (hereinafter, the "apparatus 190") in a deployed position whereby the apparatus 190 is similar in configuration to the apparatus 1 except that a support structure 191 of the apparatus 190 may be operated in a partial manual mode by providing an actuator assembly on one side of the support structure 191 for operating the support structure 191. A ramp 192 may be operated manually by a user through lifting the ramp 192 in a stowed position and lowering of the ramp 192 on the surface in a deployed position. Referring to FIG. 14, the actuator assembly may include a rack 193 and a pinion 194 wherein the rack 193 may be supported by an upper section 195 and a top section 196 of the support structure 191 while the pinion 194 is mounted on a lower section 197 of the support structure 191. A hand crank 198 is attached to the pinion 194 such that rotating the hand crank 198 rotates the pinion 194 to enable an operator to raise or lower the top section 195 of the support structure 191 to the desired height. Alternatively, more than one actuator assembly may be provided on each side of the support structure 191 respectively. This configuration requires two operators on both sides of the support structure 191 so as to control the rising or lowering of the upper sections 195 and the top section 196.

Figure 15:
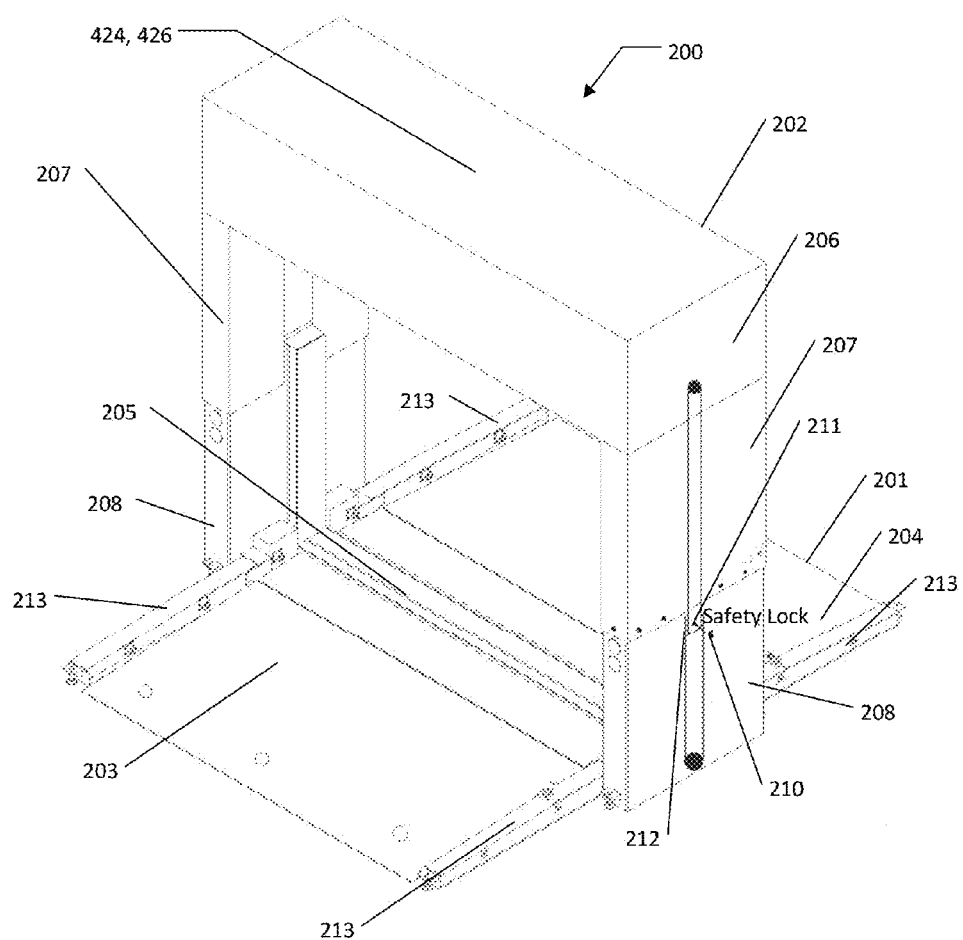
FIG. 15 illustrates a perspective view of a portable inspection apparatus in a deployed position whereby the support structure or/and the ramp may be operated in a fully manual mode.

FIG. 15 illustrates a perspective view of a portable inspection apparatus 200 in a deployed position whereby the apparatus 200 is similar in configuration to the apparatus 1 except that a ramp 201 and a support structure 202 may be operated in a fully manual mode. The apparatus 200 may be arranged for securing the ramp 201 in a stowed position. For example, the ramp 201 includes a first ramp member 203 and a second ramp member 204 opposite the first ramp member 203 whereby the first and second ramp members 203, 204 are hingedly or pivotally connected to a base 205. The first and second ramp members 203, 204 may be manually moved by an operator between a deployed position and a stowed position whereby the ramp members 203, 204 may be locked or latched against a top section 206 of the support structure 202 by a latching mechanism (not shown). The latching mechanism may include a hook and eye. Similarly, the apparatus 200 may be arranged for locking one of the emitter 424 and the detector 426 supported by the support structure 202 in a first position located at a first distance from the base 205. For example, the support structure 202 has an upper section 207 and a lower section 208. The upper section 207 may be extended to the first position by manually pushing the upper section 207 in an upward direction to a required position or height. The upper section 207 may be secured in the second position by a locking member. As shown in FIG. 15, the upper section 207 may include a bar member T1 and the lower section 208 has a slot T2 for the bar member T1 to run within the slot T2 as the one of the emitter 424 and the detector 426 moves between the first position and the second position. Each of the bar member T1 and the slot T2 may have an aperture for receiving a locking member therethrough. Further, a bar member T1 may be mounted to the top section 206 of the support structure 202. The bar member T1 may be of a cross section of any shape including but not limited to a cylinder, square, rectangular. The bar member T1 may also be a solid bar. To receive the bar member T1, a slot T2 is mounted in the lower section 208 whereby the slot T2 is sized to mate with the bar member T1. For example, the slot T may be of a have a hollow cross section sized to be identical to an external dimension of the bar member T1 so as to house the bar member T1. The bar member T1 and the slot T2 cooperate to enable the one of the emitter 424 and the detector 426 supported by the support structure 202 to be moved between a first position and a second position. The locking member may include a bolt 210 for securing the bar member T1 and the slot T2 when the emitter 424 or the detector 426 supported by the support structure 202 is in a desired position. For example, the bolt 210 may be inserted in a predefined aperture in a bottom end 211 of the bar member T1 and a predefined aperture in a top end 212 of the slot T2 to secure the support structure 202 in a desired position such as for example in one of a first position and a second position as shown in FIG. 15. Still further, the slot T2 may include an aperture or a plurality of predefined apertures along a length of the slot T2 such that a height of the support structure 202 may be adjusted according to the desired position.

In an alternative embodiment, the upper section 207 and the lower section 208 may include an aperture or a plurality of apertures being arranged to receive a locking member (not shown) therethrough to lock the one of the emitter 424 and the detector 426 supported by the support structure 202 in a first position at a first distance from the base. The plurality of apertures may be at a location defined by S1, S2, S3, S4, S5 and S6. An external support such as a fork lift may be used to support the top section 206 while the upper section 207 is being secured to the lower section 208. It will be appreciated that at least one locking mechanism may be provided to secure the support structure 202 in a desired position. However, if required, more than one locking mechanism may be added to the support structure 202 to secure and keep the top section 209 in a predetermined position/height or to control the precision of the height of the support structure 202.

Although beam members 213 are shown in the apparatus 200 as being disposed adjacent the ramp 201, it will be appreciated that the beam members 213 are optional and may not be necessary in a fully manual operation of the ramp 201 and therefore may be excluded from the apparatus 200 or any portable inspection apparatus whereby the ramp is operated manually.

It will be appreciated that a portable inspection apparatus according to any of the abovementioned embodiments may be arranged for the one of the emitter and the detector supported by the support structure to be locked in the first position supplement the operation modes of the portable inspection apparatus. Similarly, a portable apparatus accordingly to any one of the abovementioned embodiments may be arranged for the ramp to be secured in the stowed position.

Still further, it will be appreciated that the locking members and the lifting mechanisms described in FIG. 12 to FIG. 15 may be applied in any of the embodiments described herein as well as various changes in form and detail to the embodiments understood by those skilled in the art. The advantage is to incorporate a degree of redundancy in the design of such portable inspection apparatus no as to provide a back-up option for operating the apparatus in the event of a power outage or where the location for inspection of vehicles does not have a power source or power supply.

Figure 16:
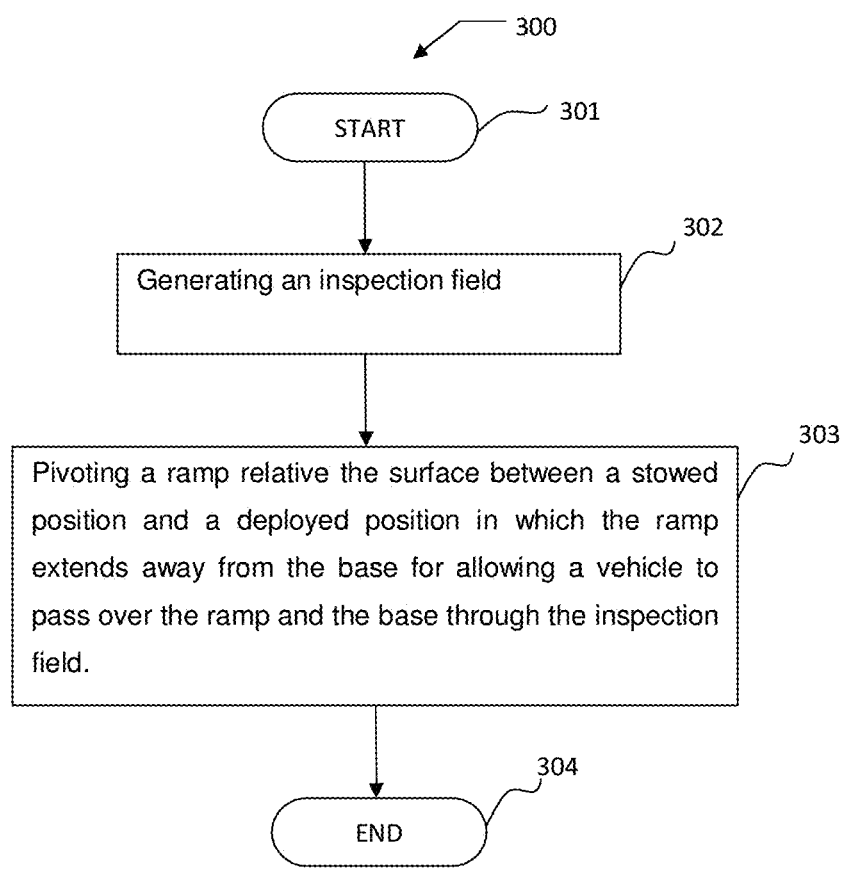
FIG. 16 is a flow chart illustrating a method of operating a portable inspection apparatus for inspecting vehicles.

FIG. 16 is a flow chart illustrating a method 300 of operating a portable inspection apparatus for placement in an inspection area and for inspection of vehicles. The method 300 may begin in step 301 by providing a support structure arranged to extend away from a surface of the inspection area, and a base for disposal on the surface. An inspection field may be generated in step 302 using an inspection field generator comprising an emitter and a detector for generating an inspection field, a first one of the emitter and the detector being supported by the support structure and a second one of the emitter and the detector being supported by the base. In step 303, a ramp may be pivoted relative the surface between a stowed position and a deployed position in which the ramp extends away from the base for allowing a vehicle to pass over the ramp and the base through the inspection field. The operation of the portable inspection apparatus may be ended in step 304. Alternatively, the method 300 may further comprise: moving the one of the emitter and the detector supported by the support structure between a first position at a first distance from the base and a second position at a second distance from the base. Moving the one of the emitter and the detector supported by the support structure may include: moving an upper section of the support structure relative to a lower section of the support structure between the first position and the second position in which a first one of the upper section and the lower section houses a part of the second one of the upper section and the lower section.

The method 300 may further comprise locking the one of the emitter and the detector supported by the support structure in the first position. Still further, the method 300 may further comprise securing the ramp in the stowed position.

In an embodiment, the portable inspection apparatus may comprise one or more wheel assemblies detachably attached to the support structure. The wheel assemblies may include roller wheels which may be detachably attached to the portable inspection apparatus for easy mobility and removed when in a deployed position or not required. The one or more wheel assemblies include a compressor and a fluid actuated cylinder configured to enable the wheel assemblies to be movable relative to a surface between an extended position extending upwardly from the surface, and a retracted position adjacent the surface. For example, the portable inspection apparatus can be fitted with heavy duty wheel assemblies so that in a stowed position, the portable inspection apparatus can be connected to a vehicle such as a truck trailer for transportation.

In all the embodiments, the emitter (400, 404, 408, 412, 416, 420 and 424) may be a radiation source such as an x-ray or gamma ray machine and the detector (402, 406, 410, 414, 418, 422, and 426) may be a receptor. For example, the emitter of the inspection field generator may be an x-ray source supported by the support structure and the detector of the inspection field generator is configured for detecting radiation from the x-ray source. In an embodiment, the detector may be supported by the base. As the inspection field generator is incorporated in the portable inspection apparatus, alignment of the detector and the emitter may be optimized because the first one of the emitter or the detector supported by the support structure may be configured to move between a first position located at a first distance from the base and a second position at a second distance from the base. In this way, a distance between the emitter and the detector can be varied according to the size of the vehicle for inspection and according to the outline dimensions of the apparatus. By maintaining a predetermined distance between the detector and the emitter, there may be less risk of distortion in an image of the vehicle being inspected and advantageously it may not be required to further compensate the image of the inspected vehicle.

By incorporating the detector and the emitter in the apparatus, an inspection system for inspecting vehicles may also be set up in a shorter amount of time as opposed to a conventional inspection system. Therefore, the portable inspection apparatus can be set up quickly and be assembled quickly in a compact manner for transportation to different locations where it is required to be set up. Further the portable inspection apparatus is of a simple design and can be used in a wide range of indoor and outdoor applications. For example, the portable inspection apparatus can be used for inspection of vehicle interiors at law enforcement, military checkpoints, custom/border checkpoints, airports, seaports, air bases, naval bases, palaces, embassies, petroleum plants, hotel premises, or any location which require inspection or security inspection. Exemplary examples of the dimensions of the portable inspection apparatus are shown in the description. However, it is to be understood that a height of the portable inspection apparatus can be customized or adjusted according to the dimensions or design requirements of the vehicle passing through the portable inspection apparatus.

Thus while embodiments and applications of the present invention have been shown and described, it would be appreciated by a person skilled in the art that other modifications are possible without departing from the inventive concepts herein.

The invention claimed is:

1. A portable inspection apparatus for placement in an inspection area and for inspection of vehicles passing through the inspection area, the portable inspection apparatus comprising:

a support structure arranged to extend away from a surface of the inspection area;

a base for disposal on the surface;

an inspection field generator comprising an emitter and a detector for generating an inspection field, wherein the emitter is configured for emitting X-ray or gamma ray radiation and the detector is configured for detecting X-ray or gamma ray radiation, a first one of the emitter and the detector being supported by the support structure and a second one of the emitter and the detector being supported by the base;

a ramp arranged to pivot relative to the surface between a stowed position and a deployed position in which the ramp extends away from the base for allowing a vehicle to pass over the ramp and the base through the inspection field; and a sensor disposed adjacent the ramp for detecting presence of an object on the ramp, wherein the first one of the emitter and the detector supported by the support structure is configured to move between a first position at a first distance from the base and a second position at a second distance from the base;

wherein the support structure includes an upper section and a lower section, wherein the upper section is movable relative to the lower section between the first position and the second position in which a first one of the upper section and the lower section houses a part of the second one of the upper section and the lower section such that the part of the second one of the upper section and the lower section is within the first one of the upper section and the lower section; and wherein the apparatus further comprising a controller for receiving a signal corresponding to the detected object on the ramp for deactivating movement of the support structure and movement of the ramp to the stowed position.

2. The apparatus as claimed in claim 1, wherein a plurality of pivots are provided adjacent the ramp for allowing the ramp to move between the stowed position and the deployed position.

3. The apparatus as claimed in claim 1, arranged for the one of the emitter and the detector supported by the support structure to be locked in the first position.

4. The apparatus as claimed in claim 3, wherein each of the upper section and the lower section includes an aperture arranged to receive a locking member therethrough to lock the one of the emitter and the detector supported by the support structure in the first position.

5. The apparatus as claimed in claim 3, wherein the upper section comprises a bar member and the lower section comprises a slot for the bar member to run within the slot as the one of the emitter and the detector supported by the support structure moves between the first position and the second position and wherein each of the bar member and the slot has a aperture for receiving a locking member therethrough.

6. The apparatus as claimed in claim 1, wherein the support structure comprises a vertical support structure and a gantry structure extending from the vertical support structure, the gantry structure arranged to support the one of the emitter and the detector supported by the support structure.

7. The apparatus as claimed in claim 1, arranged for the ramp to be secured in the stowed position.

8. The apparatus as claimed in claim 1, further comprising a first drive system for moving the ramp between the deployed position and the stowed position.

9. The apparatus as claimed in claim 1, further comprising a second drive system for moving the one of the emitter and the detector supported by the support structure between the first position and the second position.

10. The apparatus as claimed in claim 1, the controller configured for at least one of:
receiving a first control signal from a control system to control movement of the ramp relative to the surface between the deployed position and the stowed position; and
receiving a second control signal from the control system to control movement of the one of the emitter and the detector supported by the support structure between the first position and the second position.

11. The apparatus as claimed in claim 10, wherein the control system is at least one of a remote controller and a computer.

12. The apparatus as claimed in claim 1, wherein the ramp includes an aperture for bolting the ramp to the surface.

13. A method of operating a portable inspection apparatus for placement in an inspection area and for inspection of vehicles, the method comprising:
providing a support structure arranged to extend away from a surface of the inspection area;
providing a base for disposal on the surface;
generating an inspection field using an inspection field generator comprising an emitter and a detector for generating an inspection field, wherein the emitter is configured for emitting X-ray or gamma ray radiation and the detector is configured for detecting X-ray or gamma ray radiation, a first one of the emitter and the detector being supported by the support structure and a second one of the emitter and the detector being supported by the base;
pivoting a ramp relative the surface between a stowed position and a deployed position in which the ramp extends away from the base for allowing a vehicle to pass over the ramp and the base through the inspection field; and
moving the one of the emitter and the detector supported by the support structure between a first position at a first distance from the base and a second position at a second distance from the base, wherein moving the one of the emitter and the detector includes:
moving an upper section of the support structure relative to a lower section of the support structure between the first position and the second position in which a first one of the upper section and the lower section houses a part of the second one of the upper section and the lower section such that the part of the second one of the upper section and the lower section is within the first one of the upper section and the lower section;
detecting presence of an object on the ramp; and
receiving a signal corresponding to the detected object on the ramp for deactivating movement of the support structure and movement of the ramp to the stowed position.

14. The method as claimed in claim 13, further comprising locking the one of the emitter and the detector supported by the support structure in the first position.

15. The method as claimed in claim 13, further comprising securing the ramp in the stowed position.

* * * * *